US012578664B2

(12) United States Patent
Aoki et al.

(10) Patent No.: US 12,578,664 B2
(45) Date of Patent: Mar. 17, 2026

(54) TONER AND METHOD FOR PRODUCING TONER

(71) Applicant: CANON KABUSHIKI KAISHA, Tokyo (JP)

(72) Inventors: Kenji Aoki, Shizuoka (JP); Takashi Matsui, Shizuoka (JP); Yu Yoshida, Shizuoka (JP); Yuna Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 982 days.

(21) Appl. No.: 17/658,174

(22) Filed: Apr. 6, 2022

(65) Prior Publication Data

US 2022/0334507 A1 Oct. 20, 2022

(30) Foreign Application Priority Data

Apr. 13, 2021 (JP) ................................ 2021-067821
Mar. 1, 2022 (JP) ................................ 2022-030729

(51) Int. Cl.
*G03G 9/087* (2006.01)

(52) U.S. Cl.
CPC ..... *G03G 9/08728* (2013.01); *G03G 9/08795* (2013.01); *G03G 9/08797* (2013.01)

(58) Field of Classification Search
CPC ............ G03G 9/0821; G03G 9/08711; G03G 9/08731
See application file for complete search history.

(56) References Cited

U.S. PATENT DOCUMENTS 5,578,407 A 11/1996 Kasuya et al.
7,678,523 B2 3/2010 Hiroko et al.
7,842,446 B2 11/2010 Yanase et al.
7,923,190 B2 4/2011 Magome et al.
7,935,467 B2 5/2011 Dojo et al.
8,426,091 B2 4/2013 Magome et al.
8,426,094 B2 4/2013 Magome et al.
8,603,712 B2 12/2013 Aoki et al.
8,614,044 B2 12/2013 Matsui et al.
8,652,725 B2 2/2014 Watanabe et al.
8,741,519 B2 6/2014 Watanabe et al.
8,778,585 B2 7/2014 Matsui et al.
8,785,101 B2 7/2014 Kaya et al.
8,841,054 B2 9/2014 Dojo et al.
8,846,284 B2 9/2014 Kinumatsu et al.
8,883,389 B2 11/2014 Matsui et al.
9,097,997 B2 8/2015 Nomura et al.
9,158,216 B2 10/2015 Shimano et al.
9,213,250 B2 12/2015 Nomura et al.
9,217,943 B2 12/2015 Matsui et al.
9,239,528 B2 1/2016 Hasegawa et al.
9,304,422 B2 4/2016 Matsui et al.
9,309,349 B2 4/2016 Watanabe et al.
9,348,246 B2 5/2016 Magome et al.
9,354,545 B2 5/2016 Matsui et al.
9,377,705 B2 6/2016 Shimano et al.
9,383,668 B2 7/2016 Noji et al.
9,429,860 B2 8/2016 Kinumatsu et al.
9,442,416 B2 9/2016 Magome et al.
9,442,419 B2 9/2016 Wakabayashi et al.
9,575,424 B2 2/2017 Nakagawa et al.
9,581,934 B2 2/2017 Ito et al.
9,599,919 B2 3/2017 Isono et al.
9,625,844 B2 4/2017 Kaya et al.
9,658,546 B2 5/2017 Tanaka et al.
9,658,554 B2 5/2017 Kinumatsu et al.
9,785,071 B2 10/2017 Shimano et al.
9,798,256 B2 10/2017 Kosaki et al.
9,798,262 B2 10/2017 Toyoizumi et al.
9,811,016 B2 11/2017 Aoki et al.
9,823,595 B2 11/2017 Toyoizumi et al.
9,829,814 B2 11/2017 Yoshida et al.
9,829,816 B2 11/2017 Tanaka et al.
9,835,964 B2 12/2017 Yoshida et al.
9,857,707 B2 1/2018 Tsuda et al.
9,857,711 B2 1/2018 Yoshida et al.
(Continued)

FOREIGN PATENT DOCUMENTS

JP 7-175268 A 7/1995
JP 2002-108018 A 4/2002
JP 2002-179716 A 6/2002
JP 2016-66018 A 4/2016
JP 2019-211763 A 12/2019
JP 2019-215526 A 12/2019
JP 2020-173414 A 10/2020
WO 2013/047296 A1 4/2013

OTHER PUBLICATIONS

U.S. Appl. No. 13/741,372, Kenji Aoki, filed Jan. 14, 2013.
U.S. Appl. No. 14/042,241, Shotaro Nomura, filed Sep. 30, 2013.
U.S. Appl. No. 17/658,352, Yuna Yamamoto, filed Apr. 7, 2022.
U.S. Appl. No. 17/805,357, Kenji Aoki, filed Jun. 3, 2022.

*Primary Examiner* — Peter L Vajda
(74) *Attorney, Agent, or Firm* — VENABLE LLP

(57) ABSTRACT

A toner having a toner particle having a binder resin, wherein in differential scanning calorimetry using the toner as a sample, a peak temperature of an endothermic peak derived from the binder resin at a first temperature rise is from 50° C. to 70° C., and an endothermic quantity per 1 g of the toner is from 30 J/g to 70 J/g, and when acetonitrile is used as a poor solvent and chloroform is used as a good solvent for a chloroform-soluble component of the binder resin, and a component eluted during a linear change from a mobile phase composition of 100% by volume of acetonitrile to a mobile phase composition of 100% by volume of chloroform is gradient LC analyzed, a specific relationship between the peaks is satisfied.

7 Claims, No Drawings

(56) References Cited

U.S. PATENT DOCUMENTS

| | | | |
|---|---|---|---|
| 9,857,713 B2 | 1/2018 | Kosaki et al. | |
| 9,869,943 B2 | 1/2018 | Aoki et al. | |
| 9,904,195 B2 | 2/2018 | Matsui et al. | |
| 9,964,879 B2 | 5/2018 | Terui et al. | |
| 10,012,919 B2 | 7/2018 | Matsui et al. | |
| 10,012,922 B2 | 7/2018 | Yoshida et al. | |
| 10,078,285 B2 | 9/2018 | Kubo et al. | |
| 10,156,800 B2 | 12/2018 | Tsuda et al. | |
| 10,197,934 B2 | 2/2019 | Matsui et al. | |
| 10,241,430 B2 | 3/2019 | Kimura et al. | |
| 10,295,920 B2 | 5/2019 | Nishikawa et al. | |
| 10,295,922 B2 | 5/2019 | Terui et al. | |
| 10,303,075 B2 | 5/2019 | Tanaka et al. | |
| 10,409,180 B2 | 9/2019 | Koji et al. | |
| 10,656,545 B2 | 5/2020 | Kamae et al. | |
| 10,732,529 B2 | 8/2020 | Yoshiba et al. | |
| 10,732,530 B2 | 8/2020 | Matsui et al. | |
| 10,859,931 B2 | 12/2020 | Hashimoto et al. | |
| 10,877,388 B2 | 12/2020 | Aoki et al. | |
| 10,877,389 B2 | 12/2020 | Kamikura et al. | |
| 10,969,704 B2 | 4/2021 | Kagawa et al. | |
| 10,969,705 B2 | 4/2021 | Shirayama et al. | |
| 11,112,709 B2 | 9/2021 | Saeki et al. | |
| 11,169,458 B2 | 11/2021 | Toyoizumi et al. | |
| 11,181,844 B2 | 11/2021 | Nagaoka et al. | |
| 11,262,666 B2 | 3/2022 | Yoshiba et al. | |
| 11,287,758 B2 | 3/2022 | Matsui et al. | |
| 2009/0197192 A1 | 8/2009 | Hiroko et al. | |
| 2014/0205944 A1 | 7/2014 | Masuda | |
| 2015/0185658 A1 | 7/2015 | Wakabayashi et al. | |
| 2016/0091811 A1 | 3/2016 | Koi | |
| 2020/0379363 A1* | 12/2020 | Nagaoka | G03G 9/08797 |
| 2021/0026265 A1 | 1/2021 | Kamikura et al. | |
| 2021/0181646 A1 | 6/2021 | Matsui et al. | |
| 2021/0181648 A1 | 6/2021 | Shimano et al. | |
| 2021/0405549 A1 | 12/2021 | Ookubo et al. | |
| 2022/0128915 A1 | 4/2022 | Toyoda et al. | |
| 2022/0128916 A1 | 4/2022 | Yoshida et al. | |
| 2022/0128919 A1 | 4/2022 | Kawamura et al. | |

* cited by examiner

TONER AND METHOD FOR PRODUCING TONER

BACKGROUND OF THE INVENTION

Field of the Invention

The present disclosure relates to a toner used for an electrophotographic method and an electrostatic recording method, and to a method for producing a toner.

Description of the Related Art

In electrophotographic equipment, energy saving has also been considered as a major technical problem, and a significant reduction in the amount of heat required for a fixing device has been investigated. In particular, there is an increasing need for toners with so-called "low-temperature fixability", which enables fixing with lower energy. Lowering a glass transition temperature (Tg) of a binder resin in a toner is a method for enabling fixing at a low temperature. However, since lowering Tg leads to lowering the heat-resistant storage stability of the toner, it is difficult to achieve both low-temperature fixability and heat-resistant storage stability of the toner with this method.

As a countermeasure, toners to which a plasticizer is added have been investigated in, for example, WO 2013/047296 and Japanese Patent Application Publication No. 2016-066018. The plasticizer acts to increase the softening rate of the binder resin while maintaining the Tg of the toner, thereby making it possible to achieve both low-temperature fixability and heat-resistant storage stability. However, since the toner softens through the step of melting the plasticizer and plasticizing the binder resin, there is a limit to the melting rate of the toner, and further improvement in low-temperature fixability is desired.

Therefore, in order to achieve both low-temperature fixability and heat-resistant storage stability of the toner, a method of using a crystalline vinyl resin as the binder resin has been investigated. Amorphous resins commonly used as binder resins for toners do not show a clear endothermic peak in differential scanning calorimetry (DSC measurement), but when a crystalline resin component is contained, an endothermic peak appears in DSC measurement.

Crystalline vinyl resins have a property of hardly softening to the melting point due to the regular arrangement of side chains in the molecule. In addition, the crystal melts rapidly at the melting point as a boundary, and the viscosity drops sharply following such melting. For this reason, crystalline vinyl resins have been attracting attention as materials that excel in sharp melt property and have both low-temperature fixability and heat-resistant storage stability. Usually, a crystalline vinyl resin has a long-chain alkyl group as a side chain in the main chain skeleton, and the long-chain alkyl groups in the side chains crystallize to exhibit crystallinity.

Japanese Patent Application Publication No. 2020-173414 proposes a toner using a crystalline vinyl resin obtained by copolymerizing a polymerizable monomer having a long-chain alkyl group and an amorphous polymerizable monomer having an SP value different from that of the polymerizable monomer. As a result, it is considered that both low-temperature fixability and heat-resistant storage stability are achieved. Further, Japanese Patent Application Publication No. 2002-108018 proposes a toner in which a crystalline vinyl resin and a resin having a smaller contact angle with water than the crystalline vinyl resin are used in combination.

SUMMARY OF THE INVENTION

However, it was found difficult that the toners described in Japanese Patent Application Publication No. 2020-173414 and Japanese Patent Application Publication No. 2002-108018 achieve both abrasion resistance of the fixed image and charge stability in a high-temperature and high-humidity environment with satisfying the low-temperature fixability and heat-resistant storage stability. The long-chain alkyl groups are characterized by high hydrophobicity and low affinity with paper.

In the toner configurations described in Japanese Patent Application Publication No. 2020-173414 and Japanese Patent Application Publication No. 2002-108018, when the amount of long-chain alkyl groups is increased in order to ensure low-temperature fixability, the adhesiveness with paper decreases, abrasion resistance of the fixed image is degraded, and durability is lowered. It was also found that when the amount of the long-chain alkyl groups is low, the polarity of the binder resin increases, whereby the toner absorbs water in a high-temperature and high-humidity environment, and the charge stability is degraded.

Based on the above, the present disclosure provides a toner that excels in low-temperature fixability and heat-resistant storage stability and also excels in charge stability in a high-temperature and high-humidity environment and abrasion resistance of fixed images.

The present disclosure relates to a toner comprising a toner particle comprising a binder resin, wherein in differential scanning calorimetry using the toner as a sample, a peak temperature of an endothermic peak derived from the binder resin at a first temperature rise is 50 to 70° C., and an endothermic quantity per 1 g of the toner is 30 to 70 J/g, when acetonitrile is used as a poor solvent and chloroform is used as a good solvent for a chloroform-soluble component of the binder resin, and a component eluted during a linear change from a mobile phase composition of 100% by volume of acetonitrile to a mobile phase composition of 100% by volume of chloroform is gradient LC analyzed, formulas (1) and (2) below are satisfied:

$$0.08 \leq B/T \leq 0.30 \quad (1)$$

$$0.40 \leq C/T \leq 0.70 \quad (2)$$

T represents a peak area of a peak detected using a Corona charged particle detector when a proportion of chloroform in a mobile phase is 5.0 to 95.0% by volume;

B represents a peak area of a peak detected by a Corona charged particle detector when a proportion of chloroform in a mobile phase is 30.0 to 60.0% by volume; and C represents a peak area of a peak detected by a Corona charged particle detector when a proportion of chloroform in a mobile phase is 80.0 to 95.0% by volume.

Further, the present disclosure relates to a method for producing a toner comprising a toner particle comprising a binder resin, the method comprising:

a granulation step of forming particles of a polymerizable monomer composition comprising a polymerizable monomer (x) represented by formula (9) below, a polymerizable monomer other than the polymerizable monomer (x), and a polymerization initiator in an aqueous medium; and a polymerization step of obtaining toner particles by polymerizing the polymerizable monomers comprised in the particles of the polymerizable monomer composition, in the granulation step, a content ratio of the polymerizable monomer (x) in the polymerizable monomers comprised in the polymerizable monomer composition is 40.0 to 80.0% by mass;

the polymerization initiator comprises a first polymerization initiator and a second polymerization initiator, and where a 10-hour half-life temperature of the first polymerization initiator is denoted by R1, and a 10-hour half-life temperature of the second polymerization initiator is denoted by R2, R1 and R2 satisfy formulas (10) and (11) below; and the polymerization step has a step of polymerizing at a following temperature T1 (° C.) until a polymerization conversion rate of the polymerizable monomer (x) reaches 60 to 80% by mass and a polymerization conversion rate of the polymerizable monomer other than the polymerizable monomer (x) reaches 90 to 99% by mass, and a step of polymerizing at a following temperature T2 (° C.) until the polymerization conversion rate of the polymerizable monomer (x) becomes 95% by mass or more after polymerizing at the temperature T1 (° C.), $$40 \le R1 \le 60 \quad (10)$$

$$65 \le R2 \le 85 \quad (11)$$

$$R1+5 \le T1 \le R1+15 \quad (12)$$

$$R2+5 \le T2 \le R2+20 \quad (13);$$

(9)

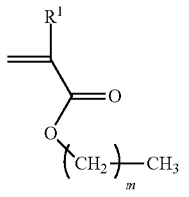

in formula (9), $R^1$ represents a hydrogen atom or a methyl group, and m represents an integer of 15 to 35.

Further, the present disclosure relates to a method for producing a toner comprising a toner particle comprising a binder resin, the method comprising:

a granulation step of forming particles of a polymerizable monomer composition comprising a polymerizable monomer (x) represented by formula (9), a polymerizable monomer other than the polymerizable monomer (x), and a polymerization initiator in an aqueous medium; and a polymerization step of obtaining toner particles by polymerizing the polymerizable monomers comprised in the particles of the polymerizable monomer composition, in the granulation step, a content ratio of the polymerizable monomer (x) in the polymerizable monomers comprised in the polymerizable monomer composition is 40.0 to 80.0% by mass;

in the polymerization step, polymerization is performed until a polymerization conversion rate of the polymerizable monomer (x) reaches 60 to 80% by mass and a polymerization conversion rate of the polymerizable monomer other than the polymerizable monomer (x) reaches 90 to 99% by mass, and then a polymerization initiator is further added and polymerization is performed until the polymerization conversion rate of the polymerizable monomer (x) becomes 95% by mass or more Further, the present disclosure relates to a method for producing a toner comprising a toner particle comprising a binder resin, the method comprising:

a granulation step of forming particles of a polymerizable monomer composition comprising a polymerizable monomer (x) represented by formula (9), a polymerizable monomer other than the polymerizable monomer (x), and a polymerization initiator in an aqueous medium; and a polymerization step of obtaining toner particles by polymerizing the polymerizable monomers comprised in the particles of the polymerizable monomer composition, in the granulation step, a content ratio of the polymerizable monomer (x) in the polymerizable monomers comprised in the polymerizable monomer composition is 30.0 to 75.0% by mass;

the polymerization step has a step (i) of performing polymerization until polymerization conversion rates of the polymerizable monomer (x) and the polymerizable monomer other than the polymerizable monomer (x) reach 90 to 99% by mass, and a step (ii) of further adding the polymerizable monomer (x) after the step (i) and performing polymerization until the polymerization conversion rate of the polymerizable monomer (x) becomes 95% by mass or more;

an amount of the polymerizable monomer (x) added in the step (ii) is 20.0 to 50.0% by mass with respect to an amount of the polymerizable monomer (x) added in the granulation step.

According to the present disclosure, it is possible to provide a toner that excels in low-temperature fixability and heat-resistant storage stability and also excels in charge stability in a high-temperature and high-humidity environment and abrasion resistance of fixed images. Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. In the present disclosure, a (meth)acrylic acid ester means an acrylic acid ester and/or a methacrylic acid ester. When numerical ranges are described in stages, the upper and lower limits of each of each numerical range may be combined arbitrarily.

The term "monomer unit" describes a reacted form of a monomeric material in a polymer. For example, one carbon-carbon bonded section in a principal chain of polymerized polymerizable monomers in a polymer is given as one unit. A polymerizable monomer can be represented by the following formula (C):

(C)

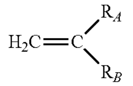

in formula (C), $R_A$ represents a hydrogen atom or alkyl group (preferably a $C_{1-3}$alkyl group, or more preferably a methyl group), and RB represents any substituent. A crystalline resin is a resin exhibiting a clear endothermic peak in differential scanning calorimetry (DSC) measurement.

The present inventors have found that the above problems can be solved by adequately controlling the peak temperature of the endothermic peak derived from the binder resin, the endothermic quantity, and the polarity of the chloroform-soluble component of the binder resin.

The present disclosure relates to a toner comprising a toner particle comprising a binder resin, wherein in differential scanning calorimetry using the toner as a sample, a peak temperature of an endothermic peak derived from the binder resin at a first temperature rise is 50 to 70° C., and an endothermic quantity per 1 g of the toner is 30 to 70 J/g, when acetonitrile is used as a poor solvent and chloroform is used as a good solvent for a chloroform-soluble component of the binder resin, and a component eluted during a linear change from a mobile phase composition of 100% by volume of acetonitrile to a mobile phase composition of 100% by volume of chloroform is gradient LC analyzed, formulas (1) and (2) below are satisfied:

$$0.08 \leq B/T \leq 0.30 \quad (1)$$

$$0.40 \leq C/T \leq 0.70 \quad (2)$$

T represents a peak area of a peak detected using a Corona charged particle detector when a proportion of chloroform in a mobile phase is 5.0 to 95.0% by volume;

B represents a peak area of a peak detected by a Corona charged particle detector when a proportion of chloroform in a mobile phase is 30.0 to 60.0% by volume; and C represents a peak area of a peak detected by a Corona charged particle detector when a proportion of chloroform in a mobile phase is 80.0 to 95.0% by volume.

In order to achieve both the low-temperature fixability and the heat-resistant storage stability, the entire binder resin has crystallinity, and it is also necessary to ensure a more effective crystal amount. For that purpose, it is necessary that the endothermic quantity representing the amount of crystal components in the binder resin be sufficient (the endothermic quantity of the endothermic peak), and it is also necessary that the developed melting point be within a range sufficient to ensure the heat-resistant storage stability (peak temperature of the endothermic peak).

In addition, a resin that generally exhibits crystallinity has a low-polarity segment such as a long-chain alkyl. It was found that the low-polarity portion such as a long-chain alkyl has a low affinity with paper, and as the amount thereof increases, the abrasion resistance tends to decrease. It is considered that in order to ensure abrasion resistance, it is necessary to ensure a certain amount of high-polarity components while minimizing the amount of low-polarity components in the binder resin (Formulas (1) and (2)). For example, in a crystalline vinyl resin, due to a low affinity of long-chain alkyl groups with paper, as the amount of the long-chain alkyl groups increases, the abrasion resistance tends to decrease. Therefore, it is preferable to control the polarity as described hereinabove.

Meanwhile, it was found that where the amount of low-polarity components such as long-chain alkyl groups in the binder resin is reduced, the amount of high-polarity components increases, thereby increasing the amount of water adsorbed and causing fogging due to insufficient charging in a high-temperature and high-humidity environment. It is considered that in order to ensure environmental stability in a high-temperature and high-humidity environment, it is necessary to ensure a certain amount of low-polarity components while minimizing the amount of high-polarity components in the binder resin (Formulas (1) and (2)).

The toner will be described in detail hereinbelow. In the differential scanning calorimetry using the toner as a sample, the peak temperature of the endothermic peak derived from the binder resin in the first temperature rise is from 50° C. to 70° C. By setting the endothermic peak temperature within the above range, it is possible to achieve both the heat-resistant storage stability and the low-temperature fixability of the toner. Where the peak temperature is lower than 50° C., it is advantageous for low-temperature fixability, but the heat-resistant storage stability of the toner is significantly degraded. Meanwhile, when the peak temperature is higher than 70° C., the heat-resistant storage stability is excellent, but the low-temperature fixability is lowered.

When the binder resin is a vinyl resin having a long-chain alkyl group, the endothermic peak temperature can be controlled by the length of the long-chain alkyl group, the ratio of the long-chain alkyl group in the binder resin, and the like. Further, when the binder resin is a polyester resin, the endothermic peak temperature can be controlled by the number of carbon atoms of the diol component and dicarboxylic acid component used. The endothermic peak temperature is preferably from 57° C. to 65° C.

Further, the endothermic quantity of the endothermic peak derived from the binder resin is from 30 J/g to 70 J/g per 1 g of the toner. The endothermic quantity of the endothermic peak reflects the proportion of the crystalline substance present in the toner in a state where the crystallinity is maintained in the entire binder resin. That is, even when a large amount of a crystalline substance is present in the toner, where the crystallinity is impaired, the endothermic quantity of the endothermic peak becomes small. Therefore, in the toner in which the endothermic quantity of the endothermic peak is in the above range, the proportion of the crystalline resin that maintains crystallinity in the toner is appropriate, and good low-temperature fixability can be obtained.

Where the endothermic quantity of the endothermic peak per 1 g of the toner is smaller than 30 J/g, it indicates that the proportion of amorphous resin is relatively large. As a result, the effect of the glass transition temperature (Tg) derived from the amorphous resin component increases. Therefore, it is difficult to show good low-temperature fixability. Where the endothermic quantity of the endothermic peak per 1 g of the toner is larger than 70 J/g, the amount of the crystalline component becomes too large, and cleavage is likely to occur at the crystal interface, so that the resin tends to be brittle and the durability is lowered.

The endothermic quantity of the endothermic peak can be controlled by the type of the resin showing crystallinity and the ratio of components showing crystallinity in the binder resin. The lower limit of the endothermic quantity of the endothermic peak per 1 g of toner is preferably 35 J/g or more, and the upper limit is preferably 60 J/g or less, and more preferably 55 J/g or less.

Further, when acetonitrile is used as a poor solvent and chloroform is used as a good solvent for a chloroform-soluble component of the binder resin, and a component eluted during a linear change from a mobile phase composition of 100% by volume of acetonitrile to a mobile phase composition of 100% by volume of chloroform is gradient LC analyzed, formulas (1) and (2) below are satisfied.

$$0.08 \leq B/T \leq 0.30 \quad (1)$$

$$0.40 \leq C/T \leq 0.70 \quad (2)$$

T represents a peak area of a peak detected using a Corona charged particle detector when the proportion of chloroform in a mobile phase is from 5.0% by volume to 95.0% by volume.

B represents a peak area of a peak detected by a Corona charged particle detector when the proportion of chloroform in a mobile phase is from 30.0% by volume to 60.0% by volume.

C represents a peak area of a peak detected by a Corona charged particle detector when the proportion of chloroform in a mobile phase is from 80.0% by volume to 95.0% by volume.

In the formulas (1) and (2), the attention is focused on the polarity of the chloroform-soluble component in the binder resin. The details of the gradient LC analysis will be described hereinbelow, but for the chloroform-soluble component in the binder resin, the component eluted at the time of a linear change from a mobile phase composition of 100% by volume of acetonitrile to a mobile phase composition of 100% by volume of chloroform is detected with the Corona charged particle detector. Acetonitrile is a highly polar solvent, and a high-polarity component is eluted. Chloroform has a low polarity, so as the amount of chloroform is increased linearly, a transition in eluted component is made from that with a high polarity to that with a low polarity. Therefore, in this analysis, separation can be performed according to the polarity of the resin in the binder resin.

The B/T represents the proportion of a component having a rather high polarity in the binder resin, and the C/T represents the proportion of a component having a low polarity in the binder resin. The fact that the B/T and C/T are within the ranges of the formulas (1) and (2) means that the binder resin contains a component having a rather high polarity and also contains a component having a low polarity. By satisfying the above ranges, it is possible to ensure charge stability and abrasion resistance of the fixed image in a high-temperature and high-humidity environment.

Where the B/T is smaller than 0.08, the amount of the component with a rather high polarity in the binder resin is too small, and the abrasion resistance of the fixed image is lowered. Where the B/T is larger than 0.30, the amount of the high-polarity component is too large, so that the charge stability in a high-temperature and high-humidity environment is degraded. The B/T preferably satisfies the following formula (4).

$$0.10 \leq B/T \leq 0.25 \quad (4)$$

Further, when the C/T is smaller than 0.40, the amount of the low-polarity component is too small, so that the charge stability in a high-temperature and high-humidity environment is lowered. Where the C/T is larger than 0.70, the amount of the low-polarity component is too large, and the adhesion to paper is lowered. The C/T preferably satisfies the following formula (5).

$$0.50 \leq C/T \leq 0.70 \quad (5)$$

In order to satisfy the above formulas (1) and (2), a method of providing a bias in the composition in the binder resin and enabling, as appropriate, the presence of a polymer having a composition having a rather high polarity and a polymer having a composition having a low polarity can be used. As such a means, when the binder resin is a vinyl resin, for example, a monomer or a polymerization initiator can be further added depending on the reactivity of the monomers used and the conversion rate transition.

When performing the gradient LC analysis of the chloroform-soluble component of the binder resin by using acetonitrile as a poor solvent and chloroform as a good solvent, it is preferable that a following formula (6) be satisfied, and it is more preferable that a formula (6') be satisfied.

$$0.00 \leq A/T \leq 0.05 \quad (6)$$

$$0.00 \leq A/T \leq 0.03 \quad (6')$$

In the formulas, A represents a peak area of a peak detected using a Corona charged particle detector when a proportion of chloroform in a mobile phase is from 5.0% by volume to 30.0% by volume. A/T represents a component having a considerably high polarity in the chloroform-soluble component of the binder resin. Where the A/T satisfies the formula (6), the charge stability becomes better, and the fogging after the toner has been allowed to stand in a high-temperature and high-humidity environment is easily suppressed. The A/T can be controlled by the amount of the high-polarity component used.

The content ratio of the chloroform-soluble component of the binder resin in the binder resin is preferably from 30% by mass to 100% by mass, and more preferably from 60% by mass to 99% by mass. When the content ratio of the chloroform-soluble component of the binder resin is within the above range, the amount of the gel component can be controlled to be small, and it becomes easy to ensure low-temperature fixability. The content ratio of the chloroform-soluble component of the binder resin can be controlled by the type and amount of the crosslinking agent used.

The binder resin is described hereinbelow. Examples of the binder resin include crystalline vinyl resins, polyester resins, polyurethane resins, epoxy resins, and the like. Further, the binder resin may be a hybrid resin in which a vinyl resin and a polyester resin are bonded. The binder resin preferably includes a vinyl resin, and is preferably a vinyl resin. The content ratio of the vinyl resin in the binder resin is preferably 50% by mass to 100% by mass, more preferably 80% by mass to 100% by mass, further preferably 90% by mass to 100% by mass, and particularly preferably 100% by mass.

A vinyl resin is a polymer or copolymer of a compound including a group having an ethylenically unsaturated bond such as a vinyl group. Examples of the group having an ethylenically unsaturated bond include a vinyl group, a (meth)allyl group, a (meth)acryloyl group, and the like. Further, the binder resin preferably has a monomer unit (a) represented by a following formula (3).

(3)

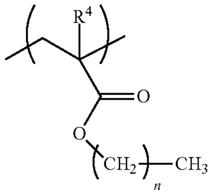

In the formula (3), $R^4$ represents a hydrogen atom or a methyl group, and n represents an integer of 15 to 35. The formula (3) shows a monomer unit having a long-chain alkyl group, and when the binder resin has a long-chain alkyl group, the binder resin tends to exhibit crystallinity. When n in the formula (3) is 15 to 35, it becomes easy to control the peak temperature of the endothermic peak derived from the binder resin within the range. n is preferably an integer of 17 to 29.

The monomer unit represented by the formula (3) can be introduced by a method of polymerizing a resin including a vinyl monomer or an ethylenically unsaturated bond with a following (meth)acrylic acid ester. For example, stearyl (meth)acrylate, nonadecyl (meth)acrylate, eicosyl (meth) acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, 2-decyltetradecyl (meth)acrylate, and the like.

The binder resin may include two or more types of monomer units represented by the formula (3). The content ratio of the monomer unit (a) represented by the formula (3) in the binder resin is preferably from 40.0% by mass to 80.0% by mass, more preferably from 40.0% by mass to 70.0% by mass, and more preferably from 40.0% by mass to 60.0% by mass. Within the above ranges, the balance between the high-polarity component and the low-polarity component in the binder resin is improved, and the low-temperature fixability, adhesion to paper, charge stability and durability become better.

Where the binder resin includes a monomer unit (b) different from the monomer unit (a) in addition to the monomer unit (a), the SP value of the monomer unit (a) is $SP_a$ and the SP value of the monomer unit (b) is $SP_b$, it is preferable that a following formula (7) be satisfied.

$$3.00 \leq (SP_b - SP_a) \leq 25.00 \quad (7)$$

Where the formula (7) is satisfied, the crystallinity of the binder resin is less likely to decrease, and the melting point is easily maintained. As a result, it becomes easy to achieve both the low-temperature fixability and the heat-resistant storage stability. The following mechanism thereof is inferred. The monomer units (a) are incorporated into a polymer, and the monomer units (a) aggregate with each other to form domains thereby developing crystallinity. Normally, where other monomer unit is incorporated, crystallization is likely to be inhibited, so that it becomes difficult to develop crystallinity as a polymer. This tendency becomes prominent when the monomer unit (a) and other monomer unit are randomly bonded in one molecule of the polymer.

Meanwhile, it is considered that when $SP_b$-$SP_a$ is in the range of the formula (7), a clear phase separation state can be formed in the binder resin without the monomer unit (a) and the monomer unit (b) being compatible with each other, and it is considered that the melting point can be easily maintained without lowering the crystallinity. It is more preferable that $SP_b$-$SP_a$ satisfy the following formula (7').

$$6.00 \leq (SP_b - SP_a) \leq 12.00 \quad (7')$$

When two or more types of monomer units (a) are contained, the $SP_a$ represents an average value calculated by the molar ratio of each monomer unit (a). For example, when a monomer unit A having an SP value of $SP_{111}$ is contained in A mol % based on the number of moles of the entire monomer unit satisfying the requirement of the monomer unit (a), and a monomer unit B having an SP value of $SP_{112}$ is contained in (100—A) mol % based on the number of moles of the entire monomer unit satisfying the requirement of the monomer unit (a), the SP value ($SP_{11}$) is $$SP_{11} = (SP_{111} \times A + SP_{112} \times (100 - A))/100$$

Meanwhile, when there are two or more types of monomer units (b), $SP_b$ represents the SP value of each monomer unit, and $SP_b$−$SP_a$ is determined for each monomer unit (b). That is, it is preferable that the monomer unit (b) has an $SP_b$ that satisfies the formula (7) with respect to the $SP_{11}$ calculated by the above method. The monomer unit (b) is preferably at least one selected from the group consisting of the monomer units represented by following formulas (8*a*) to (8*c*), and is preferably represented by a following formula (8).

(8a)

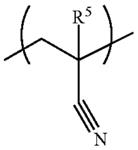

(8b)

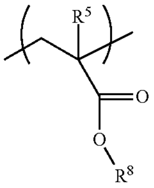

(8c)

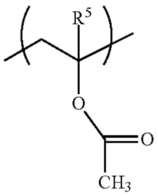

(8)

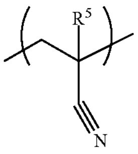

In the formulas, each $R^5$ represents a hydrogen atom or a methyl group, and $R^8$ represents a hydrogen atom or a methyl group.

The monomer unit (b) represented by the formula (8) easily satisfies the above formula (7). The monomer unit represented by the formula (8) can be introduced into the binder resin, for example, by a method of polymerizing acrylonitrile or methacrylonitrile with an ethylenically unsaturated bond in the resin or a monomer having an ethylenically unsaturated bond. The monomer (polymerizable monomer (Y)) forming the monomer unit (b) is preferably at least one selected from the group consisting of (meth)acrylonitrile, (meth)acrylic acid, (meth)methyl acrylate, and vinyl acetate.

When the binder resin includes a vinyl resin, examples of the monomer (polymerizable monomer (Y)) forming the monomer unit (b) include the following in addition to those listed above.

A monomer having a hydroxy group: for example, 2-hydroxyethyl (meth)acrylate, 2-hydroxypropyl (meth)acrylate, and the like.

A monomer having an amide group: for example, acrylamide and a monomer obtained by reacting an amine having from 1 to 30 carbon atoms and a carboxylic acid having an ethylenically unsaturated bond having from 2 to 30 carbon atoms (acrylic acid, methacrylic acid, and the like) by a known method.

A monomer having a urethane group: for example, a monomer obtained by reacting an alcohol having from 2 to 22 carbon atoms (2-hydroxyethyl methacrylate, vinyl alcohol, and the like) and an ethylenically unsaturated bond and an isocyanate having from 1 to 30 carbon atoms [a monoisocyanate compound (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, 2,6-dipropylphenylisocyanate, and the like), an aliphatic diisocyanate compound (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, and the like), an alicyclic diisocyanate compound (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, and the like), and an aromatic diisocyanate compound (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, and the like)], and the like by a known method; a monomer obtained by reacting an alcohol having from 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleil alcohol, linolenyl alcohol, nonadecyl alcohol, heneicosanol, behenyl alcohol, erucyl alcohol, and the like) and an isocyanate having from 2 to 30 carbon atoms and an ethylenically unsaturated bond [2-isocyanatoethyl (meth)acrylate, 2-(0-[1'-methylpropylidenamino]carboxyamino])ethyl (meth)acrylate, 2-[(3,5-dimethylpyrazolyl)carbonylamino]ethyl (meth)acrylate, 1,1-(bis(meth)acryloyloxymethyl)ethyl isocyanate, and the like] by a known method; and the like.

A monomer having a urea group; for example, a monomer obtained by reacting an amine having from 3 to 22 carbon atoms [primary amines (normal butylamine, t-butylamine, propylamine, isopropylamine, and the like), secondary amines (dinormalethylamine, dinormalpropylamine, dinormal butylamine, and the like), aniline, cyclohexylamine, and the like] with an isocyanate having from 2 to 30 carbon atoms and an ethylenically unsaturated bond by a known method.

A monomer having a carboxy group; for example, methacrylic acid, acrylic acid, and 2-carboxyethyl (meth)acrylate.

The content ratio of the monomer unit (b) in the binder resin is preferably 5.0% by mass to 40.0% by mass, and more preferably 20.0% by mass to 35.0% by mass.

The binder resin may include, in addition to the monomer unit (a) and the monomer unit (b), other monomer unit different from the monomer unit (a) and the monomer unit (b) (a monomer unit other than the monomer unit (a) and the monomer unit (b)). For example, the binder resin may have a third monomer unit obtained by polymerization of a third polymerizable monomer and a fourth monomer unit obtained by polymerization of a fourth polymerizable monomer. Examples of the monomer forming other monomer unit include the following: styrene, a-methylstyrene, and (meth) acrylic acid esters such as methyl (meth)acrylate, ethyl (meth)acrylate, n-butyl (meth)acrylate, t-butyl (meth)acrylate, and 2-ethylhexyl (meth)acrylate.

It is preferable to use styrene and (meth)acrylic acid esters having from 1 to 4 carbon atoms (preferably from 1 to 3, more preferably 1 or 2, and still more preferably 2) as the third polymerizable monomer and the fourth polymerizable monomer. For example, it is preferable that the third polymerizable monomer be styrene, and the fourth polymerizable monomer be at least one selected from the group consisting of (meth)acrylic acid esters having from 1 to 4 carbon atoms (preferably from 1 to 3, more preferably 1 or 2, and still more preferably 2). That is, it is preferable that the binder resin have a monomer unit obtained by polymerizing styrene represented by a following formula (A) and a monomer unit obtained by polymerizing a (meth)acrylic acid ester represented by a following formula (B). In the formula (B), $R^6$ represents a hydrogen atom or a methyl group, and $R^7$ represents an alkyl group having from 1 to 4 carbon atoms (preferably from 1 to 3, more preferably 1 or 2, and still more preferably 2).

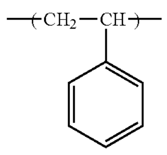

(A)

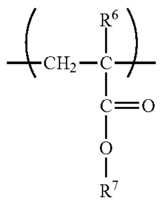

(B)

The content ratio of other monomer units (a monomer unit other than the monomer unit (a) and the monomer unit (b)) in the binder resin is preferably 5.0% by mass to 30.0% by mass. The content ratio of the monomer unit represented by the formula (A) in the binder resin is preferably 5.0% by mass to 30.0% by mass, and more preferably from 8.0% by mass to 20.0% by mass. The content ratio of the monomer unit represented by the formula (B) in the binder resin is preferably 1.0% by mass to 20.0% by mass, and more preferably 5.0% by mass to 10.0% by mass %.

Further, the binder resin preferably has a weight average molecular weight (Mw) of a tetrahydrofuran (THF) soluble component measured by gel permeation chromatography (GPC) of from 10,000 to 200,000, more preferably from 20,000 to 150,000, and further preferably from 70,000 to 110,000. When Mw is within the above range, elasticity near room temperature can be easily maintained.

The binder resin may include a polyester resin. A polyester resin that can be used as a binder resin will be described hereinbelow.

The polyester resin can be obtained by the reaction of a polyvalent carboxylic acid having a valence of two or higher and a polyhydric alcohol. Examples of the polyvalent carboxylic acid include the following compounds. Dibasic acids such as amber acid, adipic acid, sebacic acid, phthalic acid, isophthalic acid, terephthalic acid, malonic acid, dodecenyl succinic acid, and anhydrides thereof or lower alkyl esters thereof, aliphatic unsaturated dicarboxylic acid such as maleic acid, fumaric acid, itaconic acid, and citraconic acid, 1,2,4-benzenetricarboxylic acid, 1,2,5-benzenetricarboxylic acid, and anhydrides thereof or lower alkyl esters thereof. These may be used alone or in combination of two or more.

Examples of the polyhydric alcohol include the following compounds. Alkylene glycols (ethylene glycol, 1,2-propylene glycol and 1,3-propylene glycol); alkylene ether glycols (polyethylene glycol and polypropylene glycol); alicyclic diols (1,4-cyclohexanedimethanol); bisphenols (bisphenol A); and alkylene oxides of alicyclic diols (ethylene oxide and propylene oxide) adducts. The alkyl portion of the alkylene glycols and the alkylene ether glycols may be linear or branched. Other examples include glycerin, trimethylolethane, trimethylolpropane, pentaerythritol, and the like. These may be used alone or in combination of two or more.

For the purpose of adjusting the acid value and hydroxyl value, a monovalent acid such as acetic acid and benzoic acid, and a monohydric alcohol such as cyclohexanol and benzyl alcohol can also be used, if necessary. A method for producing the polyester resin is not particularly limited, and for example, a transesterification method or a direct polycondensation method can be used alone or in combination.

Next, a polyurethane resin will be described. A polyurethane resin is a reaction product of a diol and a substance including a diisocyanate group, and resins having various functional properties can be obtained by adjusting the diol and the diisocyanate.

Examples of the diisocyanate component include the following. Aromatic diisocyanates having from 6 to 20 carbon atoms (excluding carbons in the NCO group, the same applies hereinafter), aliphatic diisocyanates having from 2 to 18 carbon atoms, alicyclic diisocyanates having from 4 to 15 carbon atoms, and modified products of these diisocyanates (modified products including a urethane group, a carbodiimide group, an allophanate group, a urea group, a biuret group, a uretdione group, a uretoimine group, an isocyanurate group or an oxazolidone group; hereinafter also referred to as "modified diisocyanate"), and mixtures of two or more thereof Examples of the aromatic diisocyanates include the following. m- and/or p-xylylene diisocyanate (XDI) and α,α,α',α'-tetramethylxylylene diisocyanate.

Examples of the aliphatic diisocyanates include the following. Ethylene diisocyanate, tetramethylene diisocyanate, hexamethylene diisocyanate (HDI) and dodecamethylene diisocyanate.

Further, examples of the alicyclic diisocyanates include the following. Isophorone diisocyanate (IPDI), dicyclohexylmethane-4,4'-diisocyanate, cyclohexylene diisocyanate, and methylcyclohexylene diisocyanate.

Among these, aromatic diisocyanates having from 6 to 15 carbon atoms, aliphatic diisocyanates having from 4 to 12 carbon atoms, and alicyclic diisocyanates having from 4 to 15 carbon atoms are preferable, and XDI, IPDI and HDI are particularly preferable. Further, in addition to the diisocyanate component, a trifunctional or higher functional isocyanate compound can also be used. As the diol components that can be used for the polyurethane resin, the same divalent alcohols that can be used for the polyester resin described above can be used.

The toner particle may contain a core particle having a binder resin and a shell covering the core particle. The resin forming the shell is not particularly limited, but a vinyl resin or a polyester resin is preferable from the viewpoint of charge stability. An amorphous polyester resin is more preferable. The shell does not necessarily have to cover the entire core, and there may be an exposed portion of the core.

Release Agent

The toner may include a release agent. The release agent is preferably at least one selected from the group consisting of hydrocarbon waxes and ester waxes. By using a hydrocarbon wax and/or an ester wax, it becomes easy to secure effective releasability. The hydrocarbon wax is not particularly limited, and examples thereof include the following.

Aliphatic hydrocarbon waxes: low-molecular-weight polyethylene, low-molecular-weight polypropylene, a low-molecular-weight olefin copolymer, Fisher Tropsch wax, or wax obtained by oxidizing and acidifying these.

The ester wax may have at least one ester bond in one molecule, and either natural ester wax or synthetic ester wax may be used. The ester wax is not particularly limited, and examples thereof include the following.

Esters of monohydric alcohols and monocarboxylic acids, such as behenic behenate, stearyl stearate, palmitic palmitate, and the like;

esters of divalent carboxylic acids and monohydric alcohols, such as dibehenyl sebacate and the like;

esters of dihydric alcohols and monocarboxylic acids, such as ethylene glycol distearate, hexanediol dibehenate, and the like esters of trihydric alcohols and monocarboxylic acids, such as glycerin tribehenate and the like;

esters of a tetrahydric alcohol and monocarboxylic acids, such as pentaerythritol tetrastearate, pentaerythritol tetrapalmitate, and the like;

esters of hexahydric alcohols and monocarboxylic acids, such as dipentaerythritol hexastearate, dipentaerythritol hexapalmitate, dipentaerythritol hexabehenate, and the like;

esters of polyfunctional alcohols and monocarboxylic acids, such as polyglycerin behenate and the like; and natural ester waxes such as carnauba wax and rice wax.

Among them, esters of hexahydric alcohols and monocarboxylic acids, such as dipentaerythritol hexastearate, dipentaerythritol hexapalmitate, dipentaerythritol hexabehenate, and the like are preferable.

As a release agent, a hydrocarbon wax or an ester wax may be used alone, a hydrocarbon wax and an ester wax may be used in combination, or two or more kinds of each may be mixed and used, but it is preferable to use a hydrocarbon wax alone or two or more types thereof. It is more preferable that the release agent be a hydrocarbon wax.

The amount of the release agent in the toner particle is preferably from 1.0% by mass to 30.0% by mass, and more preferably from 2.0% by mass to 25.0% by mass. When the amount of the release agent in the toner particle is within the above ranges, the releasability at the time of fixing can be easily ensured.

The melting point of the release agent is preferably from 60° C. to 120° C. When the melting point of the release agent is within the above range, the release agent easily melts at the time of fixing and out-migrates to the surface of the toner particle, and the releasability is easily exhibited. More preferably, the melting point of the release agent is from 70° C. to 100° C.

Colorant

The toner may include a colorant. Examples of the colorant include known organic pigments, organic dyes, inorganic pigments, carbon black as a black colorant, magnetic particles and the like. In addition, a colorant conventionally used for toner may be used.

Examples of yellow colorants include the following. Condensed azo compounds, isoindolinone compounds, anthraquinone compounds, azo metal complexes, methine compounds, and allylamide compounds. Specifically, C. I. Pigment Yellow 12, 13, 14, 15, 17, 62, 74, 83, 93, 94, 95, 109, 110, 111, 128, 129, 147, 155, 168, 180 are preferably used.

Examples of magenta colorants include the following. Condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specifically, C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254 are preferably used.

Examples of cyan colorants include the following. Copper phthalocyanine compounds and derivatives thereof, anthraquinone compounds, basic dye lake compounds. Specifically, C. I. Pigment Blue 1, 7, 15, 15:1, 15:2, 15:3, 15:4, 60, 62, 66 are preferably used. The colorant is selected from the viewpoints of hue angle, saturation, lightness, light resistance, OHP transparency, and dispersibility in the toner.

The amount of the colorant is preferably from 1.0 part by mass to 20.0 parts by mass with respect to 100.0 parts by mass of the binder resin. When magnetic particles are used as the colorant, the amount thereof is preferably from 40.0 parts by mass to 150.0 parts by mass with respect to 100.0 parts by mass of the binder resin.

Charge Control Agent

If necessary, a charge control agent may be contained in the toner particle. Further, a charge control agent may be externally added to the toner particle. By blending a charge control agent, it is possible to stabilize the charge characteristics and control the optimum triboelectric charge quantity according to the developing system. As the charge control agent, known ones can be used, and in particular, a charge control agent having a high charge speed and capable of stably maintaining a constant charge quantity is preferable.

Examples of charge control agents that control the toner to be negative charging include the following. Organometallic compounds and chelate compounds are effective, and examples thereof include monoazo metal compounds, acetylacetone metal compounds, and metal compounds of aromatic oxycarboxylic acids, aromatic dicarboxylic acids, hydroxycarboxylic acids and dicarboxylic acids.

Examples of charge control agents that control the toner to be positive charging include the following. Nigrosin, quaternary ammonium salts, metal salts of higher fatty acids, diorganotin borates, guanidine compounds, and imidazole compounds. The amount of the charge control agent is preferably from 0.01 parts by mass to 20.0 parts by mass, and more preferably from 0.5 parts by mass to 10.0 parts by mass with respect to 100.0 parts by mass of the toner particle.

External Additive

The toner particles may be used as toner as they are, or may be used as toner after mixing and adhering, if necessary, an external additive or the like to the surface of the toner particle. Examples of the external additive include inorganic fine particles selected from the group consisting of silica fine particles, alumina fine particles, and titania fine particles, or composite oxides thereof. Examples of the composite oxides include silica-aluminum fine particles, strontium titanate fine particles, and the like. The amount of the external additive is preferably from 0.01 parts by mass to 8.0 parts by mass, and more preferably from 0.1 parts by mass to 4.0 parts by mass with respect to 100 parts by mass of the toner particles.

Next, a method for producing the toner will be described in detail. The toner particles may be produced by any conventionally known method such as a suspension polymerization method, an emulsion and aggregation method, a dissolution suspension method, and a pulverization method, as long as the toner particles are within the scope of the present configuration. Of these, the suspension polymerization method is preferable because the formulas (1) and (2) can be easily satisfied.

Method for Producing Toner by Suspension Polymerization Method Dispersion Step Various materials such as polymerizable monomers that produce the binder resin and, if necessary, a colorant are mixed, and a disperser is used to prepare a raw-material-dispersed solution in which the materials are melted, dissolved, or dispersed. Further, if necessary, a wax, a charge control agent, a solvent for adjusting the viscosity, and other additives mentioned in the material section can be added, as appropriate, to the raw-material-dispersed solution. As the solvent for adjusting the viscosity, a known solvent can be used without any particular limitation as long as the solvent can dissolve and disperse the abovementioned materials satisfactorily and has low solubility in water. For example, toluene, xylene, ethyl acetate, and the like can be mentioned. Examples of the disperser include a homogenizer, a ball mill, a colloid mill, and an ultrasonic disperser.

Granulation Step

The raw-material-dispersed solution is put into an aqueous medium prepared in advance, and a suspension is prepared using a disperser such as a high-speed stirring device or an ultrasonic disperser. It is preferable that the aqueous medium include a dispersion stabilizer for adjusting the particle diameter and suppressing aggregation. As the dispersion stabilizer, conventionally known dispersion stabilizers can be used without any particular limitation.

Examples of inorganic dispersion stabilizers include phosphates typified by hydroxyapatite, calcium tertiary phosphate, calcium secondary phosphate, magnesium phosphate, aluminum phosphate, zinc phosphate, and the like; carbonates typified by calcium carbonate, magnesium carbonate, and the like; metal hydroxides typified by calcium hydroxide, magnesium hydroxide, aluminum hydroxide, and the like; sulfates typified by calcium sulfate, barium sulfate, and the like; calcium metasilicate, bentonite, silica, alumina, and the like.

Examples of organic dispersion stabilizers include polyvinyl alcohol, gelatin, methyl cellulose, methyl hydroxypropyl cellulose, ethyl cellulose, sodium salt of carboxymethyl cellulose, polyacrylic acid and salts thereof, starch, and the like.

Among them, inorganic dispersion stabilizers are preferable because they have a strong charge polarization and a strong adsorption force with respect the oil phase, and therefore a strong effect of suppressing aggregation. Further, hydroxyapatite, tricalcium phosphate, and dicalcium phosphate can be easily removed by adjusting the pH and are, therefore, more preferable.

Polymerization Step

Toner particles are obtained by polymerizing the polymerizable monomers in the suspension. A polymerization initiator may be mixed with other additives when preparing the raw-material-dispersed solution, or may be mixed in the raw-material-dispersed solution immediately before suspending in the aqueous medium. Further, the polymerization initiator can be added in a state of being dissolved in a polymerizable monomer or another solvent, if necessary, during the granulation step or after completion of the granulation step, that is, immediately before the start of the polymerization step, or during the polymerization step. After polymerizing the polymerizable monomers to obtain a polymer, the solvent is removed by heating or reducing the pressure, as necessary, to obtain an aqueous dispersion liquid of toner particles.

As the polymerization initiator, a known polymerization initiator can be used without particular limitation. Specific examples thereof are listed hereinbelow. Peroxide-based polymerization initiators typified by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, performic acid-tert-butyl, peracetic acid-tert-butyl, perbenzoic acid-tert-butyl, perphenylacetic acid-tert-butyl, permethoxyacetic acid-tert-butyl, per-N-(3-toluyl)palmitic acid-tert-butylbenzoyl peroxide, t-butylperoxy-2-ethylhexanoate, t-butylperoxypivalate, t-butylperoxyisobutyrate, t-butylperoxyneodecanoate, methyl ethyl ketone peroxide, diisopropyl peroxycarbonate, cumene hydroperoxide, 2,4-dichlorobenzoyl peroxide, lauroyl peroxide, and the like; and azo-based or diazo-based polymerization initiators typified by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

When a highly hydrophilic amorphous resin is added to the raw-material-dispersed solution, the amorphous resin moves to the toner particle surface to form a shell layer in the transition from the granulation step to the polymerization step.

Filtration Step, Washing Step, Drying Step, Classification Step, External Addition Step Toner particles are obtained by performing a filtration step of obtaining solid matter by solid-liquid separation from the aqueous dispersion of toner particles, and if necessary a washing step, a drying step, and a classification step for adjusting the particle diameter. The toner particles may be used as they are as a toner. If necessary, a toner can be also obtained by mixing the toner particles and an external additive such as an inorganic fine powder with a mixer to cause the adhesion of the external additive. In the suspension polymerization method, the toner particles are preferably produced by one method of the following methods (I) to (III) so that the formulas (1) and (2) could be easily satisfied.

The production method (I) is described hereinbelow. A method for producing a toner comprising a toner particle comprising a binder resin, the method comprising: a granulation step of forming particles of a polymerizable monomer composition comprising a polymerizable monomer (x) represented by a following formula (9), a polymerizable monomer other than the polymerizable monomer (x) (other polymerizable monomer), and a polymerization initiator in an aqueous medium; and a polymerization step of obtaining toner particles by polymerizing the polymerizable monomers comprised in the particles of the polymerizable monomer composition, wherein in the granulation step, a content ratio of the polymerizable monomer (x) in the polymerizable monomers comprised in the polymerizable monomer composition is from 40.0% by mass to 80.0% by mass (more preferably 45.0% by mass to 60.0% by mass);

the polymerization initiator comprises a first polymerization initiator and a second polymerization initiator, and where a 10-hour half-life temperature of the first polymerization initiator is denoted by R1, and a 10-hour half-life temperature of the second polymerization initiator is denoted by R2, R1 and R2 satisfy following formulas (10) and (11); and the polymerization step has a step of polymerizing at a temperature T1 (° C.) until a polymerization conversion rate of the polymerizable monomer (x) reaches 60% by mass to 80% by mass (more preferably 65% by mass to 75% by mass) and a polymerization conversion rate of the polymerizable monomer other than polymerizable monomer (x) (other polymerizable monomer) reaches 90% by mass to 99% by mass (more preferably 92% by mass to 97% by mass) (first-stage polymerization reaction), and a step of polymerizing at a temperature T2 (° C.) until the polymerization conversion rate of the polymerizable monomer (x) becomes 95% by mass or more (preferably 99% by mass or more) after polymerizing at the temperature T1 (° C.) (second-stage polymerization reaction).

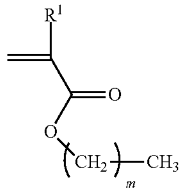

(9)

In the formula (9), $R^1$ is the same as $R^4$ in the formula (3), and m is the same as n. That is, $R^1$ represents a hydrogen atom or a methyl group, and m represents an integer of 15 to 35 (preferably an integer of 17 to 29).

$$40 \le R1 \le 60 \tag{10}$$

$$65 \le R2 \le 85 \tag{11}$$

$$R1+5 \le T1 \le R1+15 \tag{12}$$

$$R2+5 \le T2 \le R2+20 \tag{13}$$

It is more preferable that the formulas (10), (11), (12) and (13) be following formulas (10'), (11'), (12') and (13'), respectively.

$$50 \le R1 \le 60 \tag{10'}$$

$$70 \le R2 \le 80 \tag{11'}$$

$$R1+10 \le T1 \le R1+15 \tag{12'}$$

$$R2+10 \le T2 \le R2+17 \tag{13'}$$

The production method (II) is described hereinbelow. A method for producing a toner comprising a toner particle comprising a binder resin, the method comprising:

a granulation step of forming particles of a polymerizable monomer composition comprising a polymerizable monomer (x) represented by a following formula (9), a polymerizable monomer other than the polymerizable monomer (x) (other polymerizable monomer), and a polymerization initiator in an aqueous medium; and a polymerization step of obtaining toner particles by polymerizing the polymerizable monomers comprised in the particles of the polymerizable monomer composition, wherein in the granulation step, a content ratio of the polymerizable monomer (x) in the polymerizable monomers comprised in the polymerizable monomer composition is from 40.0% by mass to 80.0% by mass (more preferably 45.0% by mass to 60.0% by mass); and in the polymerization step, polymerization is performed until a polymerization conversion rate of the polymerizable monomer (x) reaches 60% by mass to 80% by mass (preferably 65% by mass to 75% by mass) and a polymerization conversion rate of the polymerizable monomer other than the polymerizable monomer (x) (other polymerizable monomer) reaches 90% by mass to 99% by mass (first-stage polymerization reaction), and then a polymerization initiator is further added and polymerization is performed until the polymerization conversion rate of the polymerizable monomer (x) becomes 95% by mass or more (preferably 99% by mass or more) (second-stage polymerization reaction).

The production method (III) is described hereinbelow. A method for producing a toner comprising a toner particle comprising a binder resin, the method comprising:

a granulation step of forming particles of a polymerizable monomer composition comprising a polymerizable monomer (x) represented by a following formula (9), a polymerizable monomer other than the polymerizable monomer (x) (other polymerizable monomer), and a polymerization initiator in an aqueous medium; and a polymerization step of obtaining toner particles by polymerizing the polymerizable monomers comprised in the particles of the polymerizable monomer composition, wherein in the granulation step, a content ratio of the polymerizable monomer (x) in the polymerizable monomers comprised in the polymerizable monomer composition is from 30.0% by mass to 75.0% by mass (more preferably 30.0% by mass to 40.0% by mass);

the polymerization step has a step (i) of performing polymerization until polymerization conversion rates of the polymerizable monomer (x) and the polymerizable monomer other than the polymerizable monomer (x) (other polymerizable monomer) reach 90% by mass to 99% by mass, and a step (ii) of further adding the polymerizable monomer (x) after the step (i) and performing polymerization until the polymerization conversion rate of the polymerizable monomer (x) becomes 95% by mass or more (preferably 99% by mass or more);

an amount of the polymerizable monomer (x) added in the step (ii) is from 20.0% by mass to 50.0% by mass (preferably from 35.0% by mass to 45.0% by mass) with respect to an amount of the polymerizable monomer (x) added in the granulation step.

By adopting one method of the production methods (I) to (III), it is possible to produce binder resins having a certain degree of bias in the amount of the polymerizable monomer (x), so that the formulas (1) and (2) can be satisfied.

The polymerizable monomer (x) represented by the formula (9) forms the monomer unit (a) represented by the formula (3). The polymerizable monomer other than the polymerizable monomer (x) (other polymerizable monomer) is exemplified by the polymerizable monomer (Y) forming the monomer unit (b), the third polymerizable monomer, and the fourth polymerizable monomer. The polymerizable monomer other than the polymerizable monomer (x) preferably includes the polymerizable monomer (Y), and more preferably includes the polymerizable monomer (Y), the third polymerizable monomer, and the fourth polymerizable monomer.

Further, a known polymerization initiator such as described above may be used without a particular limitation, and a polymerization initiator having a desired reactivity may be selected as appropriate. For example, from the abovementioned polymerization initiators, those satisfying the formulas (10) and (11) may be selected. For example, t-butylperoxypivalate in an amount of 6.0 parts by mass to 10.0 parts by mass and t-butylperoxyisobutyrate in an amount of 0.4 parts by mass to 1.5 parts by mass can be used with respect to 100 parts by mass of the polymerizable monomers.

The calculation methods and measurement methods for various physical properties of the toner and toner materials are described below.

Separation of Chloroform-Soluble Component of Binder Resin from Toner and Measurement of Content Ratio Thereof A total of 1.5 g of toner is weighed (W1 [g]), put in a pre-weighed cylindrical filter paper (trade name: No. 86R, size 28×100 mm, manufactured by Advantech Toyo Co., Ltd.), and set in a Soxhlet extractor. Extraction is performed using 200 mL of chloroform as a solvent for 18 h. At this time, the extraction is performed at a reflux rate such that the extraction cycle of the solvent is approximately once every 5 min.

After the extraction is completed, the cylindrical filter paper is taken out and air-dried, and then vacuum-dried at 40° C. for 8 h. The mass of the cylindrical filter paper including the extraction residue is weighed, and the mass of the cylindrical filter paper is subtracted to calculate the mass of the extraction residue (W2 [g]). Further, the "chloroform-soluble component comprised in the toner" can be obtained by sufficiently distilling off chloroform from this chloroform extract with an evaporator.

Next, the amount (W3 [g]) of the component other than the resin component is determined by the following procedure. Approximately 2 g of the toner is weighed into a pre-weighed 30 mL magnetic crucible (Wa [g]).

The magnetic crucible is put in an electric furnace, heated at about 900° C. for about 3 h, allowed to cool in the electric furnace, and allowed to cool in a desiccator at room temperature for 1 h or more. The crucible including the incinerator residual ash is weighed, and the amount of the incinerator residual ash (Wb [g]) is calculated by subtracting the mass of the crucible.

Then, the mass (W3 [g]) of the incinerator residual ash in the sample W1 [g] is calculated by the following formula (A).

$$W3=W1\times(Wb/Wa) \quad (A)$$

Further, when the toner includes a release agent, it is necessary to separate the binder resin and the release agent. The binder resin and the release agent are separated by separating a component having a molecular weight of 2000 or less as a release agent by recycle HPLC. The separation method is described hereinbelow.

First, the molecular weight distribution of the "chloroform-soluble component comprised in the toner" obtained by the above-described method is measured. In order to measure the molecular weight distribution, the "chloroform-soluble matter comprised in the toner" is dissolved in chloroform, and the obtained solution is filtered with a solvent-resistant membrane filter "Myshori Disc" with a pore diameter of 0.2 μm (manufactured by Tosoh Corporation) to obtain a sample solution. The sample solution is adjusted so that the concentration of the component soluble in chloroform is 1.0% by mass. Using this sample solution, the molecular weight distribution is measured under the following conditions.

Equipment: LC-Sakura NEXT (manufactured by Nippon Analytical Industry Co., Ltd.)
Column: JAIGEL2H, 4H (manufactured by Nippon Analytical Industry Co., Ltd.)
Eluent: chloroform
Flow velocity: 10.0 mL/min
Oven temperature: 40.0° C.
Sample injection amount: 1.0 mL A molecular weight calibration curve prepared using standard polystyrene resin (for example, product name: TSK standard polystyrene F-850, F-450, F-288, F-128, F-80, F-40, F-20, F-10, F-4, F-2, F A-5000, A-2500, A-1000, A-500, Tosoh Corp is used for calculating the molecular weights.

Based on the molecular weight curve thus obtained, the components having a molecular weight of 2000 or less are repeatedly separated from the chloroform solution of the "chloroform-soluble component comprised in the toner". The binder resin component (Wc [g]) is obtained by removing chloroform from the residue obtained by removing the components having a molecular weight of 2000 or less and is the "chloroform-soluble component of the binder resin". Meanwhile, the release agent component (Wd [g]) is obtained by removing chloroform from the separated components having a molecular weight of 2000 or less.

Then, the amount (W5 [g]) of the binder resin component in the chloroform-soluble component (W4 [g]) in the sample W1 [g] is calculated by the following formulas.

$$W4=W1-W2$$

$$W5=W4\times(Wc/(Wc+Wd))$$

In this case, the content ratio of the chloroform-soluble component of the binder resin in the toner is calculated by the following formula.

$$\text{Content ratio of chloroform-soluble component of the binder resin in the toner (\% by mass)}=W5/\{W5+(W2-W3)\}\times100$$

Gradient LC Analysis Method of Chloroform-Soluble Component of Binder Resin

The abovementioned "chloroform-soluble component of the binder resin" is used as a sample. The sample concentration is adjusted to 0.1% by mass with chloroform, and the solution is filtered through a 0.45 μm PTFE filter and used for measurement. The gradient polymer LC measurement conditions are shown below.

Equipment: UlTIMATE 3000 (manufactured by Thermo Fisher Scientific Corporation)
Mobile phase: A chloroform (HPLC), B acetonitrile (HPLC)
Gradient: 2 min (A/B=0/100)→25 min (A/B=100/0)
(The gradient of change in the mobile phase is made linear.)
Flow velocity: 1.0 mL/min
Injection: 0.1% by mass×20 μL
Column: Tosoh TSKgel ODS (4.6 mmφ×150 mm×5 μm)
Column temperature: 40° C.
Detector: Corona charged particle detector (Corona-CAD) (manufactured by Thermo Fisher Scientific Corporation)

For the time-intensity graph obtained by measurement, after converting the time to the proportion of chloroform, the area of the peak of the proportion of chloroform described hereinbelow is calculated. The area of the peak when the proportion of chloroform in the mobile phase is from 5.0% by volume to 95.0% by volume is denoted by T, the area of the peak when the proportion of chloroform in the mobile phase is from 30.0% by volume to 60.0% by volume is denoted by B, and the area of the peak when the proportion of chloroform in the mobile phase is from 80.0% by volume to 95.0% by volume is denoted by C. Further, the area of the peak when the proportion of chloroform in the mobile phase is from 5.0% by volume or more and less than 30.0% by volume is denoted by A. For example, when the proportion of chloroform is from 5.0% by volume to 95.0% by volume, the peak area is obtained by calculating the area of the range surrounded by a vertical axis at 5.0% by volume, a vertical axis at 95.0% by volume, an intensity curve and a horizontal axis (intensity 0).

Method for Measuring Peak Temperature of Endothermic Peak and Endothermic Quantity of Endothermic Peak The peak temperature of endothermic peak and the endothermic quantity of endothermic peak of the binder resin in the toner are measured using DSC Q2000 (manufactured by TA Instruments) under the following conditions.

Temperature rise rate: 10° C./min

Measurement start temperature: 20° C.

Measurement end temperature: 180° C.

The temperature correction of the device detector uses the melting points of indium and zinc, and the heat of fusion of indium is used for the correction of the amount of heat. Specifically, 5 mg of a sample (toner) is precisely weighed and placed in an aluminum pan to perform differential scanning calorimetry. An empty silver pan is used as a reference. As a heating process, the temperature is raised to 180° C. at a rate of 10° C./min. Then, the peak temperature and the endothermic quantity are calculated from each peak. When there are multiple peaks derived from the binder resin, the maximum peak is targeted for the peak temperature. For the endothermic quantity, the sum of the endothermic quantity of all peaks is calculated.

The toner is used as a sample. When the endothermic peak derived from the binder resin does not overlap with the endothermic peak of the release agent or the like, the former peak is handled as the endothermic peak derived from the binder resin. Meanwhile, when the endothermic peak of the release agent overlaps with the endothermic peak derived from the binder resin, it is necessary to subtract the endothermic quantity derived from the release agent.

With the following method, the endothermic quantity derived from the release agent can be subtracted to obtain the endothermic peak derived from the binder resin. First, the DSC measurement of the release agent alone is separately performed to determine the endothermic characteristics. Next, the release agent amount in the toner is determined. The release agent amount in the toner can be measured by a known structural analysis. After that, the endothermic quantity due to the release agent may be calculated from the release agent amount in the toner, and the result may be subtracted from the peak derived from the binder resin.

Where the release agent is easily compatible with the resin component, it is necessary to multiply the amount of the release agent by the compatibility rate and then calculate and subtract the endothermic quantity due to the release agent. The compatibility ratio is calculated from a value obtained by dividing the endothermic quantity obtained by melting and mixing the melt mixture of the resin components and the release agent at the same ratio as the content ratio of the release agent by the theoretical endothermic quantity calculated from the endothermic quantity of the melt mixture and the endothermic quantity of the release agent alone that have been obtained in advance. The endothermic quantity from a temperature 20.0° C. lower to a temperature 10.0° C. higher than the endothermic peak is calculated using DSC analysis software (TA Universal Analysis).

Method for Measuring Content Ratio of Various Monomer Units in Binder Resin

The content ratio of various monomer units in the binder resin is measured by $^1$H-NMR under the following conditions.

Measuring device: FT NMR device JNM-EX400 (manufactured by JEOL Ltd.)

Measurement frequency: 400 MHz

Pulse condition: 5.0 μs

Frequency range: 10,500 Hz

Cumulative number: 64 times

Measurement temperature: 30° C.

Sample: prepared by placing 50 mg of the measurement sample in a sample tube with an inner diameter of 5 mm, adding deuterated chloroform ($CDCl_3$) as a solvent, and dissolving in an autoclave at 40° C.

By using the obtained $^1$H-NMR chart, from the peaks attributed to the components of the monomer unit (a), a peak independent of the peaks attributed to the components of other monomer units is selected, and the integrated value $S_1$ of the selected peak is calculated. Similarly, from the peaks attributed to the components of the monomer unit (b), a peak independent of the peaks attributed to the components of other monomer units is selected, and the integrated value $S_2$ of the selected peak is calculated.

Further, when the third and fourth monomer units are contained, from the peaks attributed to the components of the third and fourth monomer units, the peaks independent of the peaks attributed to the components of other monomer unit are selected, and the integrated values $S_3$ and $S_4$ of the selected peaks are calculated.

The content ratio of the monomer unit (a) is determined in the following manner by using the integrated values $S_1$, $S_2$, $S_3$ and $S_4$. Here, $n_1$, $n_2$, $n_3$, and $n_4$ are each the number of hydrogen atoms in the component to which the peak of interest in each segment belongs.

$$\text{Content ratio (mol \%) of monomer unit (a)}=\{(S_1/n_1)/((S_1/n_1)+(S_2/n_2)+(S_3/n_3)+(S_4/n_4))\}\times100.$$

Similarly, the proportions of the monomer unit (b) and the third and fourth monomer units are calculated in the following manner.

$$\text{Content ratio (mol \%) of monomer unit (b)}=\{(S_2/n_2)/((S_1/n_1)+(S_2/n_2)+(S_3/n_3)+(S_4/n_4))\}\times100;$$

$$\text{Content ratio of the third monomer unit (mol \%)}=\{(S_3/n_3)/((S_1/n_1)+(S_2/n_2)+(S_3/n_3)+(S_4/n_4))\}\times100;$$

$$\text{Content ratio of the fourth monomer unit (mol\%)}=\{(S_4/n_4)/((S_1/n_1)+(S_2/n_2)+(S_3/n_3)+(S_4/n_4))\}\times100.$$

When a polymerizable monomer containing no hydrogen atom is used in the binder resin as a component other than the vinyl group, $^{13}$C-NMR is used to set the measurement nucleus to $^{13}$C, the measurement is performed in a single pulse mode, and the calculation is carried out in the same manner as in $^1$H-NMR. Further, when the toner is produced by the suspension polymerization method, the peaks of the release agent and the resin for the shell may overlap and independent peaks may not be observed. As a result, the content ratio of various units in the binder resin may not be calculated. In that case, the binder resin (') can be produced by performing the same suspension polymerization without using a release agent or other resin, and the binder resin (') can be regarded and analyzed as a binder resin.

Calculation Method of SP Value $SP_a$ and $SP_b$ are obtained in the following manner according to the calculation method proposed by Fedors. For atoms or atomic groups in the molecular structure of each monomer unit, the evaporation energy (Δei) (cal/mol) and the molar volume (Δvi) ($cm^3$/mol) are found from the table described in "Polym. Eng. Sci., 14 (2), 147-154 (1974)" and $(4.184\times\Sigma\Delta ei/\Sigma\Delta vi)^{0.5}$ is taken as the SP value $(J/cm^3)^{0.5}$.

Method for Measuring Molecular Weight of Resin

The molecular weight (weight average molecular weight Mw, number average molecular weight Mn) of the THF-soluble component of the resin is measured by gel permeation chromatography (GPC) in the following manner. First, the sample is dissolved in tetrahydrofuran (THF) at room temperature for 24 h. Then, the obtained solution is filtered through a solvent-resistant membrane filter "Myshori Disc" with a pore diameter of 0.2 μm (manufactured by Tosoh Corporation) to obtain a sample solution. The sample solution is adjusted so that the concentration of the component soluble in THF is 0.8% by mass. Using this sample solution, the measurement is conducted under the following conditions.

Equipment: HLC8120 GPC (detector: RI) (manufactured by Tosoh Corporation)
Column: seven units: Shodex KF-801, 802, 803, 804, 805, 806, and 807 (manufactured by Showa Denko KK)
Eluent: tetrahydrofuran (THF)
Flow velocity: 1.0 mL/min
Oven temperature: 40.0° C.
Sample injection amount: 0.10 mL A molecular weight calibration curve prepared using standard polystyrene resin (for example, product name: TSK standard polystyrene F-850, F-45. F-288, F-128, F-80, F-40, 0 F-4, F-2, F- A-5000, A-2500, A-1000 A-500, Tosoh Corp.) is used for calculating the molecular weights of the samples.

Method for Measuring Polymerization Conversion Rate of Polymerizable Monomer

The polymerization conversion rate of the polymerizable monomer is measured by gas chromatography (GC) in the following manner. A total of 500 mg of the toner particle-dispersed solution is put in a sample bottle. A total of 10 g of finely weighed acetone is added thereto, the bottle is closed, and thorough mixing is performed followed by irradiation for 30 min with ultrasonic waves with a desktop ultrasonic cleaner (trade name "B2510J-MTH", manufactured by Branson Ultrasonics Corporation) having an oscillation frequency of 42 kHz and an electrical output of 125 W. Then, filtration is performed using a solvent-resistant membrane filter "Myshori Disc" (manufactured by Tosoh Corporation) having a pore diameter of 0.2 μm, and 2 μL of the filtrate is analyzed by gas chromatography.

GC: 6890GC, manufactured by HP Corp.
Column: INNOWax (200 μm×0.40 μm×25 m) manufactured by HP Corp.
Carrier gas: He (constant pressure mode: 20 psi)
Oven: (1) holding at 50° C. for 10 min, (2) heating up to 200° C. at 10° C./min, (3) holding at 200° C. for 5 min
Injection port: 200° C., pulsed splitless mode (20 psi→40 psi, until 0.5 min)
Split ratio: 5.0:1.0
Detector: 250° C. (FID)

The "residual amount" of the remaining polymerizable monomer is calculated from the calibration curve plotted using the polymerizable monomer used in advance. Then, the polymerization conversion rate (% by mass) of the polymerizable monomer is defined according to the following formula.

Polymerization conversion rate (% by mass)=100×(1−(residual amount of polymerizable monomer)/(total amount of polymerizable monomer used))

In the case of a polymerizable monomer that cannot be detected by gas chromatography (for example, behenyl acrylate and the like), the polymerization conversion rate is measured by gel permeation chromatography (GPC) in the following manner. First, about 500 mg of the toner particle-dispersed solution being polymerized is precisely weighed and placed in a sample bottle. This is dissolved in about 10 g of tetrahydrofuran (THF) that has been precisely weighed. Then, the obtained solution is filtered through a solvent-resistant membrane filter "Myshori Disc" (manufactured by Tosoh Corporation) having a pore diameter of 0.2 μm to obtain a sample solution. This sample solution is used for measurement under the following conditions.

Equipment: HLC8120 GPC (detector: RI) (manufactured by Tosoh Corporation)
Column: seven units: Shodex KF-801, 802, 803, 804, 805, 806, and 807 (manufactured by Showa Denko KK)
Eluent: tetrahydrofuran (THF)
Flow velocity: 1.0 mL/min
Oven temperature: 40.0° C.
Sample injection amount: 0.10 mL Then, the "residual amount" of the remaining polymerizable monomer is calculated from the calibration curve plotted in advance using the polymerizable monomer used. Then, the polymerization conversion rate (% by mass) of the polymerizable monomer is defined according to the following formula. The measuring device and measuring conditions are the same as in the method for measuring the molecular weight of the resin.

Polymerization conversion rate (% by mass)=100×(1−(residual amount of polymerizable monomer)/(total amount of polymerizable monomer used))

EXAMPLES

Hereinafter, the present invention will be specifically described with reference to Examples, but these do not limit the present invention in any way. In the following formulations, parts are based on mass unless otherwise specified.

Example 1

Production of Toner by Suspension Polymerization Method

Production of Toner Particles 1

| | |
|---|---|
| Methacrylonitrile (polymerizable monomer (Y)) | 30.0 parts |
| Styrene (third polymerizable monomer) | 13.0 parts |
| Ethyl methacrylate (fourth polymerizable monomer) | 7.0 parts |
| Aluminum di-t-butyl salicylate | 1.0 part |
| Colorant Pigment Blue 15:3 | 6.5 parts |

A mixture consisting of the above materials was prepared. The mixture was put into an attritor (manufactured by Nippon Coke Co., Ltd.) and dispersed at 200 rpm for 2 h using zirconia beads having a diameter of 5 mm to obtain a raw-material-dispersed solution. Meanwhile, 735.0 parts of ion-exchanged water and 16.0 parts of trisodium phosphate (12-hydrate) were added to a container equipped with a high-speed stirring device Homomixer (manufactured by Primix Corporation) and a thermometer, and the temperature was raised to 60° C. while stirring at 12,000 rpm. An aqueous calcium chloride solution in which 9.0 parts of calcium chloride (dihydrate) was dissolved in 65.0 parts of ion-exchanged water was added thereto, and stirring was performed at 12,000 rpm for 30 min while maintaining 60° C. The pH was adjusted to 6.0 by adding 10% hydrochloric acid to obtain an aqueous medium in which an inorganic dispersion stabilizer including a hydroxyapatite was dispersed in water.

Subsequently, the raw-material-dispersed solution was transferred to a container equipped with a stirrer and a thermometer, and the temperature was raised to 60° C. while stirring at 100 rpm.

| | |
|---|---|
| Behenyl acrylate (polymerizable monomer (X)) | 50.0 parts |
| Release agent 1 | 10.0 parts |
| (Release agent 1: DP18<br>(dipentaerythritol stearic acid ester wax,<br>melting point 79° C.,<br>manufactured by Nippon Seiro Co., Ltd.) | |

After adding the above materials and stirring at 100 rpm for 30 min while maintaining 60° C., 7.0 parts of t-butylperoxypivalate (manufactured by NOF Corporation: Perbutyl PV) and 1.0 part of t-butyl peroxyisobutyrate (manufactured by Alchema Yoshitomi Co., Ltd.: L80) were added as polymerization initiators, followed by stirring for another 1 min and then transferring into an aqueous medium stirred at 12,000 rpm by the abovementioned high-speed stirring device. Stirring was continued at 12,000 rpm for 20 min with the high-speed stirring device while maintaining 60° C. to obtain a granulation liquid.

The granulation liquid was transferred to a reaction vessel equipped with a reflux condenser, a stirrer, a thermometer, and a nitrogen introduction tube, the temperature was raised to 70° C. (temperature T1) while stirring at 150 rpm in a nitrogen atmosphere, and a first-stage polymerization reaction was carried out at 150 rpm. The retention time of the first-stage polymerization reaction was set such that resulted in the polymerization conversion rate of the polymerizable monomer (x) of 70% by mass and the polymerization conversion rate of other polymerizable monomers of 95% by mass when the polymerization conversion rate was measured in advance while carrying out the abovementioned reaction. Then, the temperature was raised to 90° C., and the second-stage polymerization reaction was carried out for 5 h while maintaining 90° C. (temperature T2) to obtain a toner particle-dispersed solution. The polymerization conversion rate of the polymerizable monomer (x) in the second-stage polymerization reaction was 100% by mass.

The obtained toner particle-dispersed solution was cooled to 45° C. under stirring at 150 rpm, and then heat-treated for 5 h while the temperature was maintained at 45° C. Then, while maintaining stirring, dilute hydrochloric acid was added until the pH reached 1.5 to dissolve the dispersion stabilizer. The solid component was separated by filtration, thoroughly washed with ion-exchanged water, and then vacuum dried at 30° C. for 24 h to obtain toner particles 1.

Preparation of Toner 1

A total of 2.0 parts of silica fine particles (hydrophobicized with hexamethyldisilazane; average particle diameter of primary particles: 10 nm, BET specific surface area: 170 $m^2/g$) as an external additive was added to 100.0 parts of the toner particles 1, and mixing was performed at 3000 rpm for 15 min using a Henschel mixer (manufactured by Nippon Coke Co., Ltd.) to obtain a toner 1. Tables 3-1 and 3-2 show the physical characteristics of the obtained toner 1, and Table 4 shows the evaluation results.

TABLE 1-1

| | | | Binder resin | | | | | | | | | |
|---|---|---|---|---|---|---|---|---|---|---|---|---|
| Example | Toner | Production | Polymerizable monomer (X) | | Polymerizable monomer(Y) | | Third polymerizable monomer | | Fourth polymerizable monomer | | Cross-linking agent | |
| No. | No. | method | Type | Parts | Type | Parts | Type | Parts | Type | Parts | Type | Parts |
| 1 | 1 | S.P.M. | Behenyl acrylate | 50.0 | Methacrylonitrile | 30.0 | Styrene | 13.0 | Ethyl methacrylate | 7.0 | — | — |
| 2 | 2 | S.P.M. | Stearyl acrylate | 50.0 | Methacrylonitrile | 30.0 | Styrene | 13.0 | Ethyl methacrylate | 7.0 | — | — |
| 3 | 3 | S.P.M. | Myricyl acrylate | 50.0 | Methacrylonitrile | 30.0 | Styrene | 13.0 | Ethyl methacrylate | 7.0 | — | — |
| 4 | 4 | S.P.M. | Behenyl acrylate | 38.0 | Methacrylonitrile | 30.0 | Styrene | 17.0 | Ethyl methacrylate | 15.0 | — | — |
| 5 | 5 | S.P.M. | Behenyl acrylate | 42.0 | Methacrylonitrile | 30.0 | Styrene | 18.0 | Ethyl methacrylate | 10.0 | — | — |
| 6 | 6 | S.P.M. | Behenyl acrylate | 78.0 | Methacrylonitrile | 12.0 | Styrene | 7.0 | Ethyl methacrylate | 3.0 | — | — |
| 7 | 7 | S.P.M. | Behenyl acrylate | 82.0 | Methacrylonitrile | 10.0 | Styrene | 6.0 | Ethyl methacrylate | 2.0 | — | — |
| 8 | 8 | S.P.M. | Behenyl acrylate | 50.0 | Methacrylonitrile | 30.0 | Styrene | 13.0 | Ethyl methacrylate | 7.0 | — | — |
| 9 | 9 | S.P.M. | Behenyl acrylate | 50.0 | Methacrylonitrile | 30.0 | Styrene | 13.0 | Ethyl methacrylate | 7.0 | — | — |
| 10 | 10 | S.P.M. | Behenyl acrylate | 50.0 | Methacrylonitrile | 30.0 | Styrene | 13.0 | Ethyl methacrylate | 7.0 | — | — |
| 11 | 11 | S.P.M. | Behenyl acrylate | 50.0 | Methacrylonitrile | 30.0 | Styrene | 13.0 | Ethyl methacrylate | 7.0 | — | — |
| 12 | 12 | S.P.M. | Behenyl acrylate | 50.0 | Methacrylonitrile | 30.0 | Styrene | 13.0 | Ethyl methacrylate | 7.0 | — | — |
| 13 | 13 | S.P.M. | Behenyl acrylate | 50.0 | Methacrylonitrile | 30.0 | Styrene | 13.0 | Ethyl methacrylate | 7.0 | HDDA | 1.9 |
| 14 | 14 | S.P.M. | Behenyl acrylate | 50.0 | Methacrylonitrile | 30.0 | Styrene | 13.0 | Ethyl methacrylate | 7.0 | HDDA | 1.6 |
| 15 | 15 | S.P.M. | Behenyl acrylate | 50.0 | Methacrylonitrile | 30.0 | Styrene | 13.0 | Ethyl methacrylate | 7.0 | HDDA | 1.3 |
| 16 | 16 | S.P.M. | Behenyl acrylate | 50.0 | Vinyl acetate | 30.0 | Styrene | 13.0 | Ethyl methacrylate | 7.0 | — | — |

TABLE 1-1-continued

| | | | Binder resin | | | | | | | | | |
|---|---|---|---|---|---|---|---|---|---|---|---|---|
| | | | Polymerizable monomer (X) | | Polymerizable monomer(Y) | | Third polymerizable monomer | | Fourth polymerizable monomer | | Cross-linking agent | |
| Example No. | Toner No. | Production method | Type | Parts | Type | Parts | Type | Parts | Type | Parts | Type | Parts |
| 17 | 17 | S.P.M. | Behenyl acrylate | 50.0 | Acrylonitrile | 30.0 | Styrene | 13.0 | Ethyl methacrylate | 7.0 | — | — |
| 18 | 18 | S.P.M. | Behenyl acrylate | 50.0 | Methyl methacrylate | 30.0 | Styrene | 13.0 | Ethyl methacrylate | 7.0 | — | — |
| C.E. 1 | C.E. 1 | S.P.M. | Behenyl acrylate | 67.0 | Methacrylonitrile | 22.0 | Styrene | 11.0 | — | — | — | — |
| C.E. 2 | C.E. 2 | S.P.M. | Behenyl acrylate | 89.0 | Methacrylonitrile | 11.0 | — | — | — | — | — | — |
| C.E. 3 | C.E. 3 | S.P.M. | Hexadecyl acrylate | 50.0 | Methacrylonitrile | 30.0 | Styrene | 13.0 | Ethyl methacrylate | 7.0 | — | — |
| C.E. 4 | C.E. 4 | S.P.M. | Behenyl acrylate | 35.0 | Methacrylonitrile | 30.0 | Styrene | 20.0 | Ethyl methacrylate | 15.0 | — | — |
| C.E. 5 | C.E. 5 | S.P.M. | Behenyl acrylate | 50.0 | Methacrylonitrile | 30.0 | Styrene | 13.0 | Ethyl methacrylate | 7.0 | — | — |
| C.E. 6 | C.E. 6 | S.P.M. | Behenyl acrylate | 50.0 | Methacrylonitrile | 30.0 | Styrene | 13.0 | Ethyl methacrylate | 7.0 | — | — |

In Table 1-1, C. E. represents comparative example and S. P. M. represents suspension polymerization method.

TABLE 1-2

| | | First polymerization initiator | | | Second polymerization initiator | | |
|---|---|---|---|---|---|---|---|
| Example No. | Toner No. | Type | 10 h half-life temperature R1 (° C.) | Amount added (parts) | Type | 10 h half-life temperature R2 (° C.) | Amount added (parts) |
| 1 | 1 | t-Butyl peroxypivalate | 58 | 7.0 | t-Butyl peroxyisobutyrate | 75 | 1.0 |
| 2 | 2 | t-Butyl peroxypivalate | 58 | 7.0 | t-Butyl peroxyisobutyrate | 75 | 1.0 |
| 3 | 3 | t-Butyl peroxypivalate | 58 | 7.0 | t-Butyl peroxyisobutyrate | 75 | 1.0 |
| 4 | 4 | t-Butyl peroxypivalate | 58 | 7.0 | t-Butyl peroxyisobutyrate | 75 | 1.0 |
| 5 | 5 | t-Butyl peroxypivalate | 58 | 7.0 | t-Butyl peroxyisobutyrate | 75 | 1.0 |
| 6 | 6 | t-Butyl peroxypivalate | 58 | 7.0 | t-Butyl peroxyisobutyrate | 75 | 1.0 |
| 7 | 7 | t-Butyl peroxypivalate | 58 | 7.0 | t-Butyl peroxyisobutyrate | 75 | 1.0 |
| 8 | 8 | t-Butyl peroxypivalate | 58 | 9.0 | t-Butyl peroxyisobutyrate | 75 | 0.5 |
| 9 | 9 | t-Butyl peroxypivalate | 58 | 9.0 | t-Butyl peroxyisobutyrate | 75 | 0.5 |
| 10 | 10 | t-Butyl peroxypivalate | 58 | 8.0 | t-Butyl peroxyisobutyrate | 75 | 1.0 |
| 11 | 11 | t-Butyl peroxypivalate | 58 | 3.0 | t-Butyl peroxyisobutyrate | 75 | 1.5 |
| 12 | 12 | t-Butyl peroxypivalate | 58 | 9.0 | t-Butyl peroxyisobutyrate | 75 | 0.5 |
| 13 | 13 | t-Butyl peroxypivalate | 58 | 7.0 | t-Butyl peroxyisobutyrate | 75 | 1.0 |
| 14 | 14 | t-Butyl peroxypivalate | 58 | 7.0 | t-Butyl peroxyisobutyrate | 75 | 1.0 |
| 15 | 15 | t-Butyl peroxypivalate | 58 | 7.0 | t-Butyl peroxyisobutyrate | 75 | 1.0 |
| 16 | 16 | t-Butyl peroxypivalate | 58 | 7.0 | t-Butyl peroxyisobutyrate | 75 | 1.0 |
| 17 | 17 | t-Butyl peroxypivalate | 58 | 7.0 | t-Butyl peroxyisobutyrate | 75 | 1.0 |
| 18 | 18 | t-Butyl peroxypivalate | 58 | 7.0 | t-Butyl peroxyisobutyrate | 75 | 1.0 |

TABLE 1-2-continued

| | | First polymerization initiator | | | Second polymerization initiator | | |
|---|---|---|---|---|---|---|---|
| Example No. | Toner No. | Type | 10 h half-life temperature R1 (° C.) | Amount added (parts) | Type | 10 h half-life temperature R2 (° C.) | Amount added (parts) |
| C.E. 1 | C.E. 1 | t-Butyl peroxypivalate | 58 | 8.0 | — | — | — |
| C.E. 2 | C.E. 2 | t-Butyl peroxypivalate | 58 | 8.0 | — | — | — |
| C.E. 3 | C.E. 3 | t-Butyl peroxypivalate | 58 | 7.0 | t-Butyl peroxyisobutyrate | 75 | 1.0 |
| C.E. 4 | C.E. 4 | t-Butyl peroxypivalate | 58 | 7.0 | t-Butyl peroxyisobutyrate | 75 | 1.0 |
| C.E. 5 | C.E. 5 | t-Butyl peroxypivalate | 58 | 3.0 | t-Butyl peroxyisobutyrate | 75 | 1.5 |
| C.E. 6 | C.E. 6 | t-Butyl peroxypivalate | 58 | 9.0 | t-Butyl peroxyisobutyrate | 75 | 0.5 |

In Table 1-2, C. E. represents Comparative Example

TABLE 1-3

| | | Polymerization conditions | | | |
|---|---|---|---|---|---|
| Example No. | Toner No. | T1 (° C.) | Polymerization conversion rate of polymerizable monomer (x) at T1 (%) | Polymerization conversion rate of polymerizable monomer other than the polymerizable monomer (x) at T1 (%) | T2 (° C.) |
| 1 | 1 | 70 | 70 | 95 | 90 |
| 2 | 2 | 70 | 70 | 95 | 90 |
| 3 | 3 | 70 | 70 | 95 | 90 |
| 4 | 4 | 70 | 70 | 95 | 90 |
| 5 | 5 | 70 | 70 | 95 | 90 |
| 6 | 6 | 70 | 70 | 95 | 90 |
| 7 | 7 | 70 | 70 | 95 | 90 |
| 8 | 8 | 70 | 78 | 92 | 90 |
| 9 | 9 | 70 | 77 | 93 | 90 |
| 10 | 10 | 70 | 78 | 98 | 90 |
| 11 | 11 | 70 | 62 | 95 | 90 |
| 12 | 12 | 70 | 79 | 91 | 90 |
| 13 | 13 | 70 | 70 | 95 | 90 |
| 14 | 14 | 70 | 70 | 95 | 90 |
| 15 | 15 | 70 | 70 | 95 | 90 |
| 16 | 16 | 70 | 70 | 95 | 90 |
| 17 | 17 | 70 | 70 | 95 | 90 |
| 18 | 18 | 70 | 70 | 95 | 90 |
| C.E. 1 | C.E. 1 | 70 | — | — | — |
| C.E. 2 | C.E. 2 | 70 | — | — | — |
| C.E. 3 | C.E. 3 | 70 | 70 | 95 | 90 |
| C.E. 4 | C.E. 4 | 70 | 70 | 95 | 90 |

TABLE 1-3-continued

| | | Polymerization conditions | | | |
|---|---|---|---|---|---|
| Example No. | Toner No. | T1 (° C.) | Polymerization conversion rate of polymerizable monomer (x) at T1 (%) | Polymerization conversion rate of polymerizable monomer other than the polymerizable monomer (x) at T1 (%) | T2 (° C.) |
| C.E. 5 | C.E. 5 | 70 | 59 | 95 | 90 |
| C.E. 6 | C.E. 6 | 70 | 81 | 92 | 90 |

In Table 1-3, C. E. represents Comparative Example

For each toner, polymerization was carried out at a temperature T1 until the polymerization conversion rate shown in Table 1-3 was reached, and then a second polymerization reaction was carried out at a temperature T2.

TABLE 2

| | | SP value of monomer unit $(J/cm^3)^{0.5}$ |
|---|---|---|
| Polymerizable monomer (X) | Behenyl acrylate | 18.25 |
| | Stearyl acrylate | 18.39 |
| | Myricyl acrylate | 18.08 |
| | Hexadecyl acrylate | 18.47 |
| Polymerizable monomer (Y) | Acrylonitrile | 29.43 |
| | Methacrylonitrile | 25.96 |
| | Acrylic acid | 28.72 |
| | Vinyl acetate | 21.60 |
| | Methyl methacrylate | 20.31 |

TABLE 3-1

| | | | Binder resin | | | | |
|---|---|---|---|---|---|---|---|
| Example No. | Toner No. | Production method | Endothermic peak temperature (° C.) | Endothermic quantity of endothermic peak (J/g) | B/T | C/T | A/T |
| 1 | 1 | S.P.M. | 63 | 52 | 0.16 | 0.52 | 0.01 |
| 2 | 2 | S.P.M. | 52 | 52 | 0.17 | 0.51 | 0.01 |
| 3 | 3 | S.P.M. | 68 | 51 | 0.15 | 0.51 | 0.01 |
| 4 | 4 | S.P.M. | 61 | 32 | 0.24 | 0.42 | 0.02 |
| 5 | 5 | S.P.M. | 62 | 41 | 0.20 | 0.44 | 0.02 |

TABLE 3-1-continued

| Example No. | Toner No. | Production method | Binder resin: Endothermic peak temperature (° C.) | Binder resin: Endothermic quantity of endothermic peak (J/g) | Binder resin: B/T | Binder resin: C/T | Binder resin: A/T |
|---|---|---|---|---|---|---|---|
| 6 | 6 | S.P.M. | 63 | 64 | 0.12 | 0.59 | 0.01 |
| 7 | 7 | S.P.M. | 63 | 69 | 0.09 | 0.68 | 0.01 |
| 8 | 8 | S.P.M. | 63 | 50 | 0.28 | 0.48 | 0.04 |
| 9 | 9 | S.P.M. | 63 | 52 | 0.24 | 0.48 | 0.03 |
| 10 | 10 | S.P.M. | 63 | 52 | 0.16 | 0.42 | 0.01 |
| 11 | 11 | S.P.M. | 63 | 53 | 0.13 | 0.68 | 0.01 |
| 12 | 12 | S.P.M. | 63 | 51 | 0.28 | 0.48 | 0.06 |
| 13 | 13 | S.P.M. | 63 | 52 | 0.16 | 0.52 | 0.01 |
| 14 | 14 | S.P.M. | 63 | 52 | 0.16 | 0.52 | 0.01 |
| 15 | 15 | S.P.M. | 63 | 52 | 0.17 | 0.50 | 0.01 |
| 16 | 16 | S.P.M. | 59 | 38 | 0.16 | 0.53 | 0.03 |
| 17 | 17 | S.P.M. | 63 | 52 | 0.17 | 0.49 | 0.04 |
| 18 | 18 | S.P.M. | 53 | 38 | 0.17 | 0.51 | 0.01 |
| 19 | 19 | S.P.M. | 63 | 52 | 0.16 | 0.52 | 0.01 |
| 20 | 20 | S.P.M. | 63 | 52 | 0.16 | 0.52 | 0.01 |
| C.E. 1 | C.E. 1 | S.P.M. | 62 | 56 | 0.18 | 0.35 | 0.01 |
| C.E. 2 | C.E. 2 | S.P.M. | 62 | 76 | 0.06 | 0.66 | 0.01 |
| C.E. 3 | C.E. 3 | S.P.M. | 48 | 52 | 0.17 | 0.51 | 0.01 |
| C.E. 4 | C.E. 4 | S.P.M. | 58 | 28 | 0.26 | 0.41 | 0.03 |
| C.E. 5 | C.E. 5 | S.P.M. | 63 | 52 | 0.11 | 0.72 | 0.01 |
| C.E. 6 | C.E. 6 | S.P.M. | 63 | 50 | 0.32 | 0.48 | 0.04 |
| C.E. 7 | C.E. 7 | E.A.M. | 60 | 56 | 0.18 | 0.36 | 0.01 |

In Table 3-1, C. E. represents comparative example, S. P. M. represents suspension polymerization method, E. A. M. represents emulsion and aggregation method.

TABLE 3-2

| Example No. | Toner No. | Binder resin: Number of carbon atoms in alkyl group of monomer unit (a) | Binder resin: Proportion of monomer unit (a) (% by mass) | Binder resin: Chloroform-soluble component (% by mass) | Binder resin: Monomer unit (b) | Binder resin: $SP_b - SP_a$ | Binder resin: Mw |
|---|---|---|---|---|---|---|---|
| 1 | 1 | 22 | 50.0 | 98 | Methacrylonitrile | 7.71 | 88000 |
| 2 | 2 | 18 | 50.0 | 98 | Methacrylonitrile | 7.57 | 86000 |
| 3 | 3 | 30 | 50.0 | 97 | Methacrylonitrile | 7.88 | 78400 |
| 4 | 4 | 22 | 38.0 | 97 | Methacrylonitrile | 7.71 | 58900 |
| 5 | 5 | 22 | 42.0 | 98 | Methacrylonitrile | 7.71 | 63500 |
| 6 | 6 | 22 | 78.0 | 98 | Methacrylonitrile | 7.71 | 69400 |
| 7 | 7 | 22 | 82.0 | 97 | Methacrylonitrile | 7.71 | 82300 |
| 8 | 8 | 22 | 50.0 | 97 | Methacrylonitrile | 7.71 | 76900 |
| 9 | 9 | 22 | 50.0 | 96 | Methacrylonitrile | 7.71 | 75800 |
| 10 | 10 | 22 | 50.0 | 96 | Methacrylonitrile | 7.71 | 69600 |
| 11 | 11 | 22 | 50.0 | 96 | Methacrylonitrile | 7.71 | 74800 |
| 12 | 12 | 22 | 50.0 | 97 | Methacrylonitrile | 7.71 | 72500 |
| 13 | 13 | 22 | 50.0 | 29 | Methacrylonitrile | 7.71 | 135000 |
| 14 | 14 | 22 | 50.0 | 32 | Methacrylonitrile | 7.71 | 114000 |
| 15 | 15 | 22 | 50.0 | 65 | Methacrylonitrile | 7.71 | 108300 |
| 16 | 16 | 22 | 50.0 | 97 | Vinyl acetate | 3.35 | 84700 |

TABLE 3-2-continued

| | | Binder resin | | | | | |
|---|---|---|---|---|---|---|---|
| Example No. | Toner No. | Number of carbon atoms in alkyl group of monomer unit (a) | Proportion of monomer unit (a) (% by mass) | Chloroform-soluble component (% by mass) | Monomer unit (b) | $SP_b - SP_a$ | Mw |
| 17 | 17 | 22 | 50.0 | 95 | Acrylonitrile | 11.19 | 80200 |
| 18 | 18 | 22 | 50.0 | 97 | Methyl methacrylate | 2.07 | 78600 |
| 19 | 19 | 22 | 50.0 | 98 | Methacrylo-nitrile | 7.71 | 75800 |
| 20 | 20 | 22 | 50.0 | 98 | Methacrylo-nitrile | 7.71 | 82500 |
| C.E. 1 | C.E. 1 | 22 | 67.0 | 97 | Methacrylo-nitrile | 7.71 | 56000 |
| C.E. 2 | C.E. 2 | 22 | 89.0 | 96 | Methacrylo-nitrile | 7.71 | 57800 |
| C.E. 3 | C.E. 3 | 16 | 50.0 | 98 | Methacrylo-nitrile | 7.49 | 56000 |
| C.E. 4 | C.E. 4 | 22 | 35.0 | 97 | Methacrylo-nitrile | 7.71 | 62000 |
| C.E. 5 | C.E. 5 | 22 | 50.0 | 96 | Methacrylo-nitrile | 7.71 | 63000 |
| C.E. 6 | C.E. 6 | 22 | 50.0 | 96 | Methacrylo-nitrile | 7.71 | 78000 |
| C.E. 7 | C.E. 7 | 18 | 69.0 | 65 | Acrylic acid | 4.97 | 68000 |

In Table 3-2, C. E. represents comparative example.

The proportion of the monomer unit (a) indicates the content ratio in the binder resin. Mw indicates the weight average molecular weight of the tetrahydrofuran-soluble component of the binder resin.

Examples 2 to 18

Toner particles 2 to 18 were all obtained in the same manner as in Example 1, except that the types and addition amounts of the polymerizable monomers used, the types and addition amounts of the first polymerization initiator and the second polymerization initiator, and the polymerization conditions were changed as shown in Tables 1-1, 1-2 and 1-3.

Further, the same external addition as in Example 1 was performed to obtain toners 2 to 18. Tables 3-1 and 3-2 show the physical characteristics of the toners, and Table 4 shows the evaluation results. In Table 1-1, the HDDA indicated as a crosslinking agent represents 1,6-hexanediol diacrylate.

Example 19

Production of Toner Particles 19

| | |
|---|---|
| Methacrylonitrile (polymerizable monomer (Y)) | 30.0 parts |
| Styrene (third polymerizable monomer) | 13.0 parts |
| Ethyl methacrylate (fourth polymerizable monomer) | 7.0 parts |
| Aluminum di-t-butyl salicylate | 1.0 part |
| Colorant Pigment Blue 15:3 | 6.5 parts |

A mixture consisting of the above materials was prepared. The mixture was put into an attritor (manufactured by Nippon Coke Co., Ltd.) and dispersed at 200 rpm for 2 h using zirconia beads having a diameter of 5 mm to obtain a raw-material-dispersed solution.

Meanwhile, 735.0 parts of ion-exchanged water and 16.0 parts of trisodium phosphate (12-hydrate) were added to a container equipped with a high-speed stirring device Homomixer (manufactured by Primix Corporation) and a thermometer, and the temperature was raised to 60° C. while stirring at 12,000 rpm. An aqueous calcium chloride solution in which 9.0 parts of calcium chloride (dihydrate) was dissolved in 65.0 parts of ion-exchanged water was added thereto, and stirring was performed at 12,000 rpm for 30 min while maintaining 60° C. The pH was adjusted to 6.0 by adding 10% hydrochloric acid to obtain an aqueous medium in which an inorganic dispersion stabilizer including a hydroxyapatite was dispersed in water.

Subsequently, the raw-material-dispersed solution was transferred to a container equipped with a stirrer and a thermometer, and the temperature was raised to 60° C. while stirring at 100 rpm.

| | |
|---|---|
| Behenyl acrylate (polymerizable monomer (X)) | 50.0 parts |
| Release agent 1 | 10.0 parts |

After adding the above materials and stirring at 100 rpm for 30 min while maintaining 60° C., 7.0 parts of t-butylperoxypivalate (manufactured by NOF Corporation: Perbutyl PV) was added as polymerization initiators, followed by stirring for another 1 min and then transferring into an aqueous medium stirred at 12,000 rpm by the abovementioned high-speed stirring device. Stirring was continued at 12,000 rpm for 20 min with the high-speed stirring device while maintaining 60° C. to obtain a granulation liquid.

The granulation liquid was transferred to a reaction vessel equipped with a reflux condenser, a stirrer, a thermometer, and a nitrogen introduction tube, the temperature was raised to 70° C. while stirring at 150 rpm in a nitrogen atmosphere, and a first-stage polymerization reaction was carried out at 150 rpm. The retention time of the first-stage polymerization reaction was set such that resulted in the polymerization conversion rate of the polymerizable monomer (x) of 70% by mass and the polymerization conversion rate of other polymerizable monomers of 95% by mass when the polymerization conversion rate was measured in advance while carrying out the abovementioned reaction. Then, 2.0 parts of t-butyl peroxypivalate was added, and the second-stage polymerization reaction was carried out for 5 h to obtain a toner particle-dispersed solution. The polymerization conversion rate of the polymerizable monomer (x) in the second-stage polymerization reaction was 100% by mass.

The obtained toner particle-dispersed solution was cooled to 45° C. under stirring at 150 rpm, and then heat-treated for 5 h while the temperature was maintained at 45° C. Then, while maintaining stirring, dilute hydrochloric acid was added until the pH reached 1.5 to dissolve the dispersion stabilizer. The solid component was separated by filtration, thoroughly washed with ion-exchanged water, and then vacuum dried at 30° C. for 24 h to obtain toner particles 19.

Preparation of Toner 19

A total of 2.0 parts of silica fine particles (hydrophobicized with hexamethyldisilazane; average particle diameter of primary particles: 10 nm, BET specific surface area: 170 $m^2/g$) as an external additive was added to 100.0 parts of the toner particles 19, and mixing was performed at 3000 rpm for 15 min using a Henschel mixer (manufactured by Nippon Coke Co., Ltd.) to obtain a toner 19. Tables 3-1 and 3-2 show the physical characteristics of the obtained toner 19, and Table 4 shows the evaluation results.

Example 20

Production of Toner Particles 20

| | |
|---|---|
| Methacrylonitrile (polymerizable monomer (Y)) | 30.0 parts |
| Styrene (third polymerizable monomer) | 13.0 parts |
| Ethyl methacrylate (fourth polymerizable monomer) | 7.0 parts |
| Aluminum di-t-butyl salicylate | 1.0 part |
| Colorant Pigment Blue 15:3 | 6.5 parts |

A mixture consisting of the above materials was prepared. The mixture was put into an attritor (manufactured by Nippon Coke Co., Ltd.) and dispersed at 200 rpm for 2 h using zirconia beads having a diameter of 5 mm to obtain a raw-material-dispersed solution.

Meanwhile, 735.0 parts of ion-exchanged water and 16.0 parts of trisodium phosphate (12-hydrate) were added to a container equipped with a high-speed stirring device Homomixer (manufactured by Primix Corporation) and a thermometer, and the temperature was raised to 60° C. while stirring at 12,000 rpm. An aqueous calcium chloride solution in which 9.0 parts of calcium chloride (dihydrate) was dissolved in 65.0 parts of ion-exchanged water was added thereto, and stirring was performed at 12,000 rpm for 30 min while maintaining 60° C. The pH was adjusted to 6.0 by adding 10% hydrochloric acid to obtain an aqueous medium in which an inorganic dispersion stabilizer including a hydroxyapatite was dispersed in water.

Subsequently, the raw-material-dispersed solution was transferred to a container equipped with a stirrer and a thermometer, and the temperature was raised to 60° C. while stirring at 100 rpm.

| | |
|---|---|
| Behenyl acrylate (polymerizable monomer (X)) | 35.0 parts |
| Release agent 1 | 10.0 parts |

After adding the above materials and stirring at 100 rpm for 30 min while maintaining 60° C., 9.0 parts of t-butylperoxypivalate (manufactured by NOF Corporation: Perbutyl PV) was added as polymerization initiators, followed by stirring for another 1 min and then transferring into an aqueous medium stirred at 12,000 rpm by the abovementioned high-speed stirring device. Stirring was continued at 12,000 rpm for 20 min with the high-speed stirring device while maintaining 60° C. to obtain a granulation liquid.

The granulation liquid was transferred to a reaction vessel equipped with a reflux condenser, a stirrer, a thermometer, and a nitrogen introduction tube, the temperature was raised to 70° C. while stirring at 150 rpm in a nitrogen atmosphere, and a first-stage polymerization reaction was carried out at 150 rpm. The retention time of the first-stage polymerization reaction was set such that resulted in the polymerization conversion rate of the polymerizable monomer (x) of 93% by mass and the polymerization conversion rate of other polymerizable monomers of 95% by mass when the polymerization conversion rate was measured in advance while carrying out the abovementioned reaction. Then, 15.0 parts of behenyl acrylate was added, and the second-stage polymerization reaction was carried out for 5 h to obtain a toner particle-dispersed solution. The polymerization conversion rate of the polymerizable monomer (x) in the second-stage polymerization reaction was 100% by mass.

The obtained toner particle-dispersed solution was cooled to 45° C. under stirring at 150 rpm, and then heat-treated for 5 h while the temperature was maintained at 45° C. Then, while maintaining stirring, dilute hydrochloric acid was added until the pH reached 1.5 to dissolve the dispersion stabilizer. The solid component was separated by filtration, thoroughly washed with ion-exchanged water, and then vacuum dried at 30° C. for 24 h to obtain toner particles 20.

Preparation of Toner 20

A total of 2.0 parts of silica fine particles (hydrophobicized with hexamethyldisilazane; average particle diameter of primary particles: 10 nm, BET specific surface area: 170 $m^2/g$) as an external additive was added to 100.0 parts of the toner particles 20, and mixing was performed at 3000 rpm for 15 min using a Henschel mixer (manufactured by Nippon Coke Co., Ltd.) to obtain a toner 20. Tables 3-1 and 3-2 show the physical characteristics of the obtained toner 20, and Table 4 shows the evaluation results.

Comparative Example 1

Production of Comparative Toner Particles 1

| | |
|---|---|
| Methacrylonitrile (polymerizable monomer (Y)) | 22.0 parts |
| Styrene (third polymerizable monomer) | 11.0 parts |
| Aluminum di-t-butyl salicylate | 1.0 part |
| Colorant Pigment Blue 15:3 | 6.5 parts |

A mixture consisting of the above materials was prepared. The mixture was put into an attritor (manufactured by Nippon Coke Co., Ltd.) and dispersed at 200 rpm for 2 h using zirconia beads having a diameter of 5 mm to obtain a raw-material-dispersed solution.

Meanwhile, 735.0 parts of ion-exchanged water and 16.0 parts of trisodium phosphate (12-hydrate) were added to a container equipped with a high-speed stirring device Homomixer (manufactured by Primix Corporation) and a thermometer, and the temperature was raised to 60° C. while stirring at 12,000 rpm. An aqueous calcium chloride solution in which 9.0 parts of calcium chloride (dihydrate) was dissolved in 65.0 parts of ion-exchanged water was added thereto, and stirring was performed at 12,000 rpm for 30 min while maintaining 60° C. The pH was adjusted to 6.0 by adding 10% hydrochloric acid to obtain an aqueous medium in which an inorganic dispersion stabilizer including a hydroxyapatite was dispersed in water.

Subsequently, the raw-material-dispersed solution was transferred to a container equipped with a stirrer and a thermometer, and the temperature was raised to 60° C. while stirring at 100 rpm.

| | |
|---|---|
| Behenyl acrylate (polymerizable monomer (X)) | 67.0 parts |
| Release agent 1 | 10.0 parts |
| (Release agent 1: | |
| DP 18 (dipentaerythritol stearic acid ester wax, | |
| melting point 79° C., | |
| manufactured by Nippon Seiro Co., Ltd.) | |

After adding the above materials and stirring at 100 rpm for 30 min while maintaining 60° C., 8.0 parts of t-butylperoxypivalate (manufactured by NOF Corporation: Perbutyl PV) was added as polymerization initiators, followed by stirring for another 1 min and then transferring into an aqueous medium stirred at 12,000 rpm by the abovementioned high-speed stirring device. Stirring was continued at 12,000 rpm for 20 min with the high-speed stirring device while maintaining 60° C. to obtain a granulation liquid.

The granulation liquid was transferred to a reaction vessel equipped with a reflux condenser, a stirrer, a thermometer, and a nitrogen introduction tube, and the temperature was raised to 70° C. while stirring at 150 rpm in a nitrogen atmosphere. A polymerization reaction was carried out at 150 rpm for 10 h while maintaining 70° C. to obtain a toner particle-dispersed solution.

The obtained toner particle-dispersed solution was cooled to 45° C. under stirring at 150 rpm, and then heat-treated for 5 h while the temperature was maintained at 45° C. Then, while maintaining stirring, dilute hydrochloric acid was added until the pH reached 1.5 to dissolve the dispersion stabilizer. The solid component was separated by filtration, thoroughly washed with ion-exchanged water, and then vacuum dried at 30° C. for 24 h to obtain comparative toner particles 1.

Preparation of Comparative Toner 1

A total of 2.0 parts of silica fine particles (hydrophobicized with hexamethyldisilazane; average particle diameter of primary particles: 10 nm, BET specific surface area: 170 $m^2/g$) as an external additive was added to 100.0 parts of the comparative toner particles 1, and mixing was performed at 3000 rpm for 15 min using a Henschel mixer (manufactured by Nippon Coke Co., Ltd.) to obtain a comparative toner 1. Tables 3-1 and 3-2 show the physical characteristics of the obtained comparative toner 1, and Table 4 shows the evaluation results.

Comparative Example 2

Comparative toner particles 2 were obtained in the same manner as in Comparative Example 1, except that the types and amounts of the polymerizable monomers used were changed as shown in Table 1-1. Further, the same external addition as in Example 1 was performed to obtain a comparative toner 2. Tables 3-1 and 3-2 show the physical characteristics of the toner, and Table 4 shows the evaluation results.

Comparative Examples 3 to 6

Comparative toner particles 3 to 6 were obtained in the same manner as in Example 1, except that the types and addition amounts of the polymerizable monomers used, the types and addition amounts of the first polymerization initiator and the second polymerization initiator, and the polymerization conditions were changed as shown in Tables 1-1, 1-2 and 1-3. Further, the same external addition as in Example 1 was carried out to obtain comparative toners 3 to 6. Tables 3-1 and 3-2 show the physical characteristics of the toner, and Table 4 shows the evaluation results.

Comparative Example 7

Preparation of Resin Particle-Dispersed Solution 1

| | |
|---|---|
| Styrene | 300.0 parts |
| Stearyl acrylate | 700.0 parts |
| Dodecyl mercaptan | 6.0 parts |
| Decanediol acrylic acid ester | 4.0 parts |

The above materials were mixed and dissolved, and the solution was dispersed and emulsified in a flask in a solution obtained by dissolving 20.0 parts of anionic surfactant Newrex Paste H (manufactured by NOF Corporation) in 1300.0 parts of ion-exchanged water. While stirring for 10 min, 200.0 parts of ion-exchanged water in which 20.0 parts of ammonium persulfate was dissolved was added, and after nitrogen substitution, the contents were heated to 70° C. and emulsion polymerization was carried out for 6 h. Then, the reaction liquid was cooled to room temperature to prepare a resin particle-dispersed solution 1.

Preparation of Resin Particle-Dispersed Solution 2

| | |
|---|---|
| Styrene | 300.0 parts |
| Stearyl acrylate | 700.0 parts |
| Acrylic acid | 20.0 parts |
| Dodecyl mercaptan | 12.0 parts |
| Decanediol acrylic acid ester | 4.0 parts |

The above materials were mixed and dissolved, and the solution was dispersed and emulsified in a flask in a solution obtained by dissolving 20.0 parts of anionic surfactant Newrex Paste H (manufactured by NOF Corporation) in 1300.0 parts of ion-exchanged water. While stirring for 10 min, 200.0 parts of ion-exchanged water in which 20.0 parts of ammonium persulfate was dissolved was added, and after nitrogen substitution, the contents were heated to 70° C. and emulsion polymerization was carried out for 6 h. Then, the reaction liquid was cooled to room temperature to prepare a resin particle-dispersed solution 2.

Preparation of Colorant-Dispersed Solution

| | |
|---|---|
| Phthalocyanine pigment | 250 parts |
| (Manufactured by Dainichiseika Color | |
| & Chemicals Mfg. | |
| Co., Ltd.: PV FAST BLUE) | |
| Anionic surfactant | 20 parts |
| (Manufactured by DKS Co., | |
| Ltd.: NEOGEN RK) | |
| Ion-exchanged water | 730 parts |

The above materials were mixed and dissolved, and then dispersed using a homogenizer (ULTRA-TURRAX, manufactured by IKA) to obtain a colorant-dispersed solution.

Preparation of Release Agent Particle-Dispersed Solution

| | |
|---|---|
| Polyethylene wax (Manufactured by Toyo Petrolite Co., Ltd.: POLYWAX 725) | 400 parts |
| Anionic surfactant (Manufactured by NOF Corporation: Newrex R) | 20 parts |
| Ion-exchanged water | 580 parts |

The above materials were mixed and dissolved, then dispersed using a homogenizer (ULTRA-TURRAX, manufactured by IKA), and then dispersed with a pressure discharge homogenizer to prepare a release agent particle-dispersed solution in which the release agent particles (polyethylene wax) were dispersed.

Production of Comparative Toner Particles 7

| | |
|---|---|
| Resin particle-dispersed solution 1 | 900.0 parts |
| Resin particle-dispersed solution 2 | 225.0 parts |
| Colorant particle-dispersed solution | 100.0 parts |
| Release agent particle-dispersed solution | 63.0 parts |
| Aluminum sulfate (Manufactured by Wako Pure Chemical Industries, Ltd.) | 5.0 parts |
| Ion-exchanged water | 1000.0 parts |

The above materials were accommodated in a round stainless steel flask, adjusted to pH 2.0, dispersed using a homogenizer (ULTRA-TURRAX T50, manufactured by IKA), and then heated in a heating oil bath to 64° C. while stirring. After holding at 61° C. for 3 h, observations with an optical microscope confirmed that aggregated particles having an average particle diameter of about 5.0 μm were formed. After further heating and stirring at 61° C. for 4 h, observations with an optical microscope confirmed that aggregated particles having an average particle size of about 5.4 μm were formed. The pH of the aggregated particles was 2.5. An aqueous solution of sodium hydrogen carbonate (manufactured by Wako Pure Chemical Industries, Ltd.) diluted to 0.5% by weight was added thereto and the pH was adjusted to 7.2, followed by heating to 90° C. while continuing stirring and maintaining the temperature for 6 h. Then, the reaction product was filtered, thoroughly washed with ion-exchanged water, and then dried using a vacuum dryer to obtain comparative toner particles 7. The average particle diameter of the obtained comparative toner particles 7 was 5.5 μm. Further, the same external addition as in Example 1 was performed to obtain a comparative toner 7. Tables 3-1 and 3-2 show the physical characteristics of the toner, and Table 4 shows the evaluation results.

Toner Evaluation Methods

<1> Low-Temperature Fixability

A process cartridge filled with the toner was allowed to stand at 25° C. and a humidity of 40% RH for 48 h. Using the LBP-712Ci modified to operate even when the fixing device was removed, an unfixed image of an image pattern in which 10 mm ×10 mm square images were evenly arranged at 9 points on the entire transfer paper was output. The toner laid-on level on the transfer paper was set to 0.80 mg/cm$^2$, and the fixing start temperature was evaluated. As the transfer paper, Fox River Bond (90 g/m$^2$) was used.

The fixing device of LBP-712Ci was removed to the outside, and an external fixing device was used that could operate outside the laser beam printer. In the external fixing device, the fixing temperature was raised from 90° C. in increments of 5° C., and fixing was performed under the condition of a process speed of 230 mm/sec. The fixed image was visually confirmed, and the low-temperature fixability was evaluated according to the following criteria, with the lowest temperature at which cold offset did not occur as the fixing start temperature. Table 4 shows the evaluation results.

Evaluation Criteria

A: Fixing start temperature is 100° C. or less

B: Fixing start temperature is from 105° C. to 110° C.

C: Fixing start temperature is from 115° C. to 120° C.

D: Fixing start temperature is 125° C. or higher

<2> Heat-Resistant Storage Stability

The heat-resistant storage stability was evaluated in order to evaluate the stability during storage. A total of 5 g of toner was put in a 100 mL resin cup and allowed to stand at a temperature of 50° C. and a humidity of 70% RH for 3 days, and then the degree of toner aggregation was measured in the following manner and evaluated according to the following criteria. The measuring device was configured by connecting a digital display type vibrometer "DIGIVIBRO MODEL 1332A" (manufactured by Showa Sokki Co., Ltd.) to the side surface portion of a vibrating table of "POWDER TESTER" (manufactured by Hosokawa Micron Corporation). Then, a sieve with a mesh opening of 38 μm (400 mesh), a sieve with a mesh opening of 75 μm (200 mesh), and a sieve with a mesh opening of 150 μm (100 mesh) were stacked and set in this order from the bottom on the vibration table of the powder tester. The measurement was carried out in the environment at 23° C. and 60% RH in the following manner.

(1) The vibration amplitude of the shaking table was adjusted in advance so that the displacement value of the digital display type vibrometer was 0.60 mm (peak-to-peak).

(2) The toner allowed to stand for 3 days as described above was allowed to stand in advance in the environment at 23° C. and 60% RH for 24 h. A total of 5.00 g of the toner was precisely weighed and gently placed on a sieve having an opening of 150 μm on the uppermost stage.

(3) After vibrating the sieve for 15 sec, the mass of the toner remaining on each sieve was measured, and the degree of aggregation was calculated based on the following formula. Table 4 shows the evaluation results.

Degree of aggregation (%)={(sample mass (g) on a sieve with an opening of 150 μm)/5.00 (g)}×100+{(sample mass (g) on a sieve with an opening of 75 μm)/5.00 (g)}×100×0.6 +{(sample mass (g) on a sieve with an opening of 38 μm)/5.00 (g)}×100×0.2

Evaluation Criteria

A: Degree of aggregation is less than 10%

B: Degree of aggregation is 10% or more and less than 15%

C: Degree of aggregation is 15% or more and less than 20%

D: Degree of aggregation is 20% or more

<3> Adhesion to Paper (Abrasion Resistance of Fixed Image)

A fixed image was printed by the same method as in the evaluation of <1> hereinabove. The fixing temperature was set to a temperature 10° C. higher than the fixing start temperature. The image area of the obtained fixed image was covered with a soft thin paper (trade name "DASPER", manufactured by Ozu Corporation), and the image area was rubbed back and forth 5 times while applying a load of 4.9 kPa from above the thin paper. The image density before and after rubbing was measured, and the reduction rate of image density ΔD (%) was calculated by the following formula. This ΔD (%) was used as an index of abrasion resistance.

ΔD (%)={[(image density before rubbing)−(image density after rubbing)]/(image density before rubbing)}×100

The image density was measured with a color reflection densitometer (Color reflection densitometer X-Rite 404A: manufacturer X-Rite, Inc.). Table 4 shows the evaluation results.

Evaluation Criteria

A: Density reduction rate is less than 3.0%

B: Density reduction rate is 3.0% or more and less than 7.0%

C: Density reduction rate is 7.0% or more and less than 10.0%

D: Density reduction rate is 10.0% or more

<4> Charge Stability

LBP-712Ci was used, and 3000 images with a print percentage of 1% were printed out using the printer in a high-temperature and high-humidity environment (HH) (temperature 32.5° C., humidity 80% RH). The printer was allowed to stand for 3 days, and one image having a white background was printed out. The reflectance of the obtained image was measured using a reflection densitometer (reflectometer model TC-6DS manufactured by Tokyo Denshoku Co., Ltd.). An amber filter was used as the filter used in the measurement. Dr−Ds where Ds (%) is the worst value of the white background reflectance and Dr (%) is the reflectance of the transfer material before image formation was evaluated as fogging according to the following criteria. Table 4 shows the evaluation results.

Evaluation Criteria

A: Fog is less than 1.0%

B: Fogging is 1.0% or more and less than 3.0%

C: Fogging is 3.0% or more and less than 5.0%

D: Fogging is 5.0% or more

<5> Durability

Durability was evaluated using a commercially available Canon printer LBP712Ci. LBP-712Ci employs one-component contact development, and the amount of toner on the developing bearing member is regulated by a toner regulating member. An evaluation cartridge prepared by taking out the toner contained in the commercially available cartridge, cleaning the inside of the cartridge by an air blow, and then loading 100 g of the toner to be evaluated was used. The evaluation was carried out by mounting the cartridge on the cyan station and mounting dummy cartridges on other stations.

Using Fox River Bond (90 g/m$^2$) under a 15° C. and 10% RH environment, images with a print percentage of 1% were continuously output. After outputting 11,000 sheets, a solid image with a toner laid-on level of 0.40 mg/cm$^2$ was output, and the presence or absence of streaks (development streaks) on the image was checked. After that, images with a print percentage of 1% were continuously output, a solid image was output for every 1000 sheets, and the presence or absence of development streaks was checked. Table 4 shows the evaluation results.

Evaluation Criteria

A: Up to 15,000 sheets, no development streaks occur

B: Development streaks occur at 14,000 sheet

C: Development streaks occur at 12,000 and 13,000 sheets

D: Development streaks occur at 11,000 sheets

TABLE 4

| | | Low-temperature fixability | | Heat-resistant storage stability | | Adhesion to paper | | Charge stability | | Durability | |
|---|---|---|---|---|---|---|---|---|---|---|---|
| | Toner | Fixing start temper-ature (° C.) | Rank | Degree of aggregation after 3 days at 50° C. (%) | Rank | Density reduction rate after rubbing (%) | Rank | Fogging after allowing to stay in HH | Rank | Occurrence of development streaks (number of sheets) | Rank |
| E. 1 | toner 1 | 95 | A | 5 | A | 2.2 | A | 0.8 | A | At or after 15,000 | A |
| E. 2 | toner 2 | 90 | A | 18 | C | 2.1 | A | 0.7 | A | At or after 15,000 | A |
| E. 3 | toner 3 | 115 | C | 3 | A | 2.0 | A | 0.8 | A | At or after 15,000 | A |
| E. 4 | toner 4 | 115 | C | 4 | A | 1.2 | A | 4.6 | C | At or after 15,000 | A |
| E. 5 | toner 5 | 110 | B | 3 | A | 1.6 | A | 2.7 | B | At or after 15,000 | A |
| E. 6 | toner 6 | 90 | A | 4 | A | 5.6 | B | 0.5 | A | 14000 | B |
| E. 7 | toner 7 | 90 | A | 4 | A | 9.7 | C | 0.3 | A | 13000 | C |
| E. 8 | toner 8 | 95 | A | 4 | A | 2.7 | A | 4.6 | C | At or after 15,000 | A |

TABLE 4-continued

| | Toner | Low-temperature fixability: Fixing start temperature (° C.) | Rank | Heat-resistant storage stability: Degree of aggregation after 3 days at 50° C. (%) | Rank | Adhesion to paper: Density reduction rate after rubbing (%) | Rank | Charge stability: Fogging after allowing to stay in HH | Rank | Durability: Occurrence of development streaks (number of sheets) | Rank |
|---|---|---|---|---|---|---|---|---|---|---|---|
| E. 9 | toner 9 | 95 | A | 5 | A | 1.9 | A | 2.8 | B | At or after 15,000 | A |
| E. 10 | toner 10 | 95 | A | 4 | A | 1.9 | A | 4.4 | C | At or after 15,000 | A |
| E. 11 | toner 11 | 95 | A | 5 | A | 9.3 | C | 0.5 | A | At or after 15,000 | A |
| E. 12 | toner 12 | 95 | A | 5 | A | 3.2 | B | 4.6 | C | At or after 15,000 | A |
| E. 13 | toner 13 | 110 | B | 5 | A | 2.1 | A | 0.8 | A | At or after 15,000 | A |
| E. 14 | toner 14 | 105 | B | 5 | A | 2.2 | A | 0.8 | A | At or after 15,000 | A |
| E. 15 | toner 15 | 100 | A | 4 | A | 2.0 | A | 0.8 | A | At or after 15,000 | A |
| E. 16 | toner 16 | 105 | B | 9 | A | 2.0 | A | 0.9 | A | At or after 15,000 | A |
| E. 17 | toner 17 | 95 | A | 7 | A | 2.0 | A | 0.8 | A | At or after 15,000 | A |
| E. 18 | toner 18 | 105 | B | 17 | C | 2.1 | A | 0.9 | A | At or after 15,000 | A |
| E. 19 | toner 19 | 95 | A | 7 | A | 2.1 | A | 0.9 | A | At or after 15,000 | A |
| E. 20 | toner 20 | 95 | A | 5 | A | 2.2 | A | 0.9 | A | At or after 15,000 | A |
| C.E. 1 | C.T. 1 | 95 | A | 5 | A | 1.2 | A | 5.8 | D | At or after 15,000 | A |
| C.E. 2 | C.T. 2 | 90 | A | 6 | A | 10.9 | D | 0.3 | A | 11000 | D |
| C.E. 3 | C.T. 3 | 90 | A | 23 | D | 2.2 | A | 0.8 | A | At or after 15,000 | A |
| C.E. 4 | C.T. 4 | 125 | D | 9 | A | 1.2 | A | 4.8 | C | At or after 15,000 | A |
| C.E. 5 | C.T. 5 | 95 | A | 5 | A | 11.3 | D | 0.3 | A | At or after 15,000 | A |
| C.E. 6 | C.T. 6 | 95 | A | 7 | A | 1.2 | A | 5.4 | D | At or after 15,000 | A |
| C.E. 7 | C.T. 7 | 95 | A | 6 | A | 1.2 | A | 5.9 | D | At or after 15,000 | A |

In Table 4, E. represents example, C. E. represents comparative example and C. T. represents comparative toner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067821, filed Apr. 13, 2021, and Japanese Patent Application No. 2022-030729, filed Mar. 1, 2022, which are hereby incorporated by reference herein in their entirety.

What is claimed is:

1. A toner, comprising:

a toner particle comprising a binder resin, which is a copolymer of (i) behenyl acrylate, (ii) acrylonitrile or methacrylonitrile, (iii) styrene, and (iv) ethyl methacrylate; and a content ratio of a monomer unit derived from behenyl acrylate in the binder resin being 40.0-80.0% by mass, wherein in differential scanning calorimetry using the toner as a sample, a peak temperature of an endothermic peak derived from the binder resin at a first temperature rise is 50 to 70° C., and an endothermic quantity per 1 g of the toner is 30 to 70 J/g, and when acetonitrile is used as a poor solvent and chloroform is used as a good solvent for a chloroform-soluble component of the binder resin, and a component eluted during a linear change from a mobile phase composition of 100% by volume of acetonitrile to a mobile phase composition of 100% by volume of chloroform is gradient LC analyzed, $$0.08 \leq B/T \leq 0.30 \quad (1)$$

$$0.40 \leq C/T \leq 0.70 \quad (2)$$

where T represents a peak area of a peak detected using a Corona charged particle detector when a proportion of chloroform in a mobile phase is 5.0 to 95.0 % by volume, B represents a peak area of a peak detected by a Corona charged particle detector when a proportion of chloroform in a mobile phase is 30.0 to 60.0% by volume, and C represents a peak area of a peak detected by a Corona charged particle detector when a proportion of chloroform in a mobile phase is 80.0 to 95.0% by volume.

2. The toner according to claim 1, wherein $$0.10 \leq B/T \leq 0.25 \quad (4)$$

3. The toner according to claim 1, wherein $$0.50 \le C/T \le 0.70 \quad (5)$$

4. The toner according to claim 1, wherein when performing a gradient LC analysis of the chloroform-soluble component of the binder resin by using acetonitrile as a poor solvent and chloroform as a good solvent, $$0.00 \le A/T \le 0.05 \quad (6)$$

where A represents a peak area of a peak detected using a Corona charged particle detector when a proportion of chloroform in a mobile phase is 5.0 to 30.0% by volume.

5. The toner according to claim 1, wherein a content ratio of the chloroform-soluble component of the binder resin is 30 to 100% by mass based on a mass of the binder resin.

6. The toner according to claim 1, wherein the binder resin is a vinyl resin.

7. A method for producing the toner according to claim 1, the method comprising the steps of:

a granulation step of forming particles of a polymerizable monomer composition comprising a polymerizable monomer (x) represented by formula (9), a polymerizable monomer other than the polymerizable monomer (x), and a polymerization initiator in an aqueous medium (9)

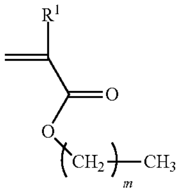

where $R^1$ represents a hydrogen atom or a methyl group, and m represents an integer of 15 to 35; and a polymerization step of obtaining toner particles by polymerizing the polymerizable monomers comprised in the particles of the polymerizable monomer composition, wherein the granulation and polymerization steps are according to any of (I) to (III)

(I) in the granulation step, a content ratio of the polymerizable monomer (x) in the polymerizable monomers comprised in the polymerizable monomer composition is 40.0 to 80.0% by mass, the polymerization initiator comprises a first polymerization initiator and a second polymerization initiator, and $40 \le R1 \le 60$ and $65 \le R2 \le 85$ where R1 is a 10-hour half-life temperature of the first polymerization initiator, and R2 is a 10-hour half-life temperature of the second polymerization initiator, and the polymerization step has (a) a step of polymerizing at temperature T1 (° C.) until a polymerization conversion rate of the polymerizable monomer (x) reaches 60 to 80% by mass and a polymerization conversion rate of the polymerizable monomer other than the polymerizable monomer (x) reaches 90 to 99% by mass, where $R1+5 \le T1 \le R1+15$, and (b) a step of polymerizing at temperature T2 (° C.) until the polymerization conversion rate of the polymerizable monomer (x) becomes 95% by mass or more after polymerizing at temperature T1 (° C.), where $R2+5 \le T2 \le R2+20$;

(II) in the granulation step, a content ratio of the polymerizable monomer (x) in the polymerizable monomers comprised in the polymerizable monomer composition is 40.0 to 80.0% by mass, and in the polymerization step, polymerization is performed until a polymerization conversion rate of the polymerizable monomer (x) reaches 60 to 80% by mass and a polymerization conversion rate of the polymerizable monomer other than the polymerizable monomer (x) reaches 90 to 99% by mass, and then a polymerization initiator is further added and polymerization is performed until the polymerization conversion rate of the polymerizable monomer (x) becomes 95% by mass or more; or (III) in the granulation step, a content ratio of the polymerizable monomer (x) in the polymerizable monomers comprised in the polymerizable monomer composition is 30.0 to 75.0% by mass, the polymerization step has (i) a step of performing polymerization until polymerization conversion rates of the polymerizable monomer (x) and the polymerizable monomer other than the polymerizable monomer (x) reach 90 to 99% by mass, and (ii) a step of further adding the polymerizable monomer (x) after step (i) and performing polymerization until the polymerization conversion rate of the polymerizable monomer (x) becomes 95% by mass or more, and an amount of the polymerizable monomer (x) added in step (ii) is 20.0 to 50.0% by mass with respect to an amount of the polymerizable monomer (x) added in the granulation.

* * * * *